United States Patent
Terashima et al.

(10) Patent No.: US 8,264,170 B2
(45) Date of Patent: Sep. 11, 2012

(54) DISCHARGE LAMP LIGHTING DEVICE, METHOD OF DRIVING DISCHARGE LAMP, AND PROJECTOR

(75) Inventors: Tetsuo Terashima, Chino (JP); Kazuo Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 348 days.

(21) Appl. No.: 12/698,356

(22) Filed: Feb. 2, 2010

(65) Prior Publication Data
US 2010/0201281 A1 Aug. 12, 2010

(30) Foreign Application Priority Data
Feb. 9, 2009 (JP) .................................. 2009-027162

(51) Int. Cl.
*H05B 37/02* (2006.01)
(52) U.S. Cl. ................... 315/308; 315/246; 315/360
(58) Field of Classification Search ............... 315/209 R, 315/225, 246, 287, 291, 307, 308, 360
See application file for complete search history.

(56) References Cited

U.S. PATENT DOCUMENTS

| | | | |
|---|---|---|---|
| 6,888,321 B2 * | 5/2005 | Arimoto et al. ................ | 315/289 |
| 6,927,539 B2 * | 8/2005 | Arimoto et al. ................ | 315/59 |
| 7,023,144 B2 | 4/2006 | Suzuki et al. | |
| 7,275,835 B2 | 10/2007 | Kataoka | |
| 7,508,144 B2 * | 3/2009 | Yamauchi et al. ............. | 315/291 |
| 7,586,270 B2 * | 9/2009 | Niggemeyer et al. .......... | 315/291 |
| 2002/0011803 A1 * | 1/2002 | Derra et al. .................... | 315/246 |
| 2009/0322245 A1 * | 12/2009 | Horikawa ...................... | 315/287 |

FOREIGN PATENT DOCUMENTS

| | | |
|---|---|---|
| JP | 2003-059184 A | 2/2003 |
| JP | 2005-276623 A | 10/2005 |
| JP | 2006-059790 A | 3/2006 |
| JP | 2006-072196 A | 3/2006 |
| JP | 2007-087637 A | 4/2007 |
| JP | 2009-211897 A | 9/2009 |

* cited by examiner

*Primary Examiner* — Tung X Le
(74) *Attorney, Agent, or Firm* — AdvantEdge Law Group, LLC

(57) ABSTRACT

In at least one embodiment of the disclosure, a discharge lamp lighting device includes a discharge lamp driving unit that drives a discharge lamp by supplying an AC driving current to the discharge lamp. A memory unit is configured to store driving parameters for the AC driving current. A control unit is configured to control the discharge lamp driving unit based on the driving parameters stored in the memory unit. The driving parameters comprise a range of holding time values, each holding time value representing a time period in which the AC driving current is to be continuously maintained at a same polarity. Upon a predetermined time condition, the control unit selects one of the holding time values based on a predetermined probability and controls the discharge lamp driving unit based on the selected holding time value.

20 Claims, 12 Drawing Sheets

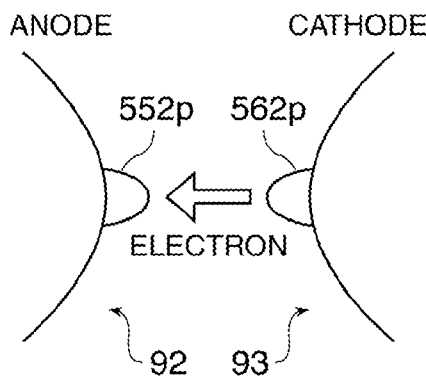
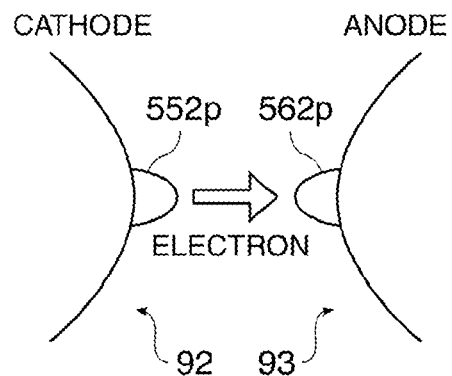
FIG. 5A  FIG. 5B
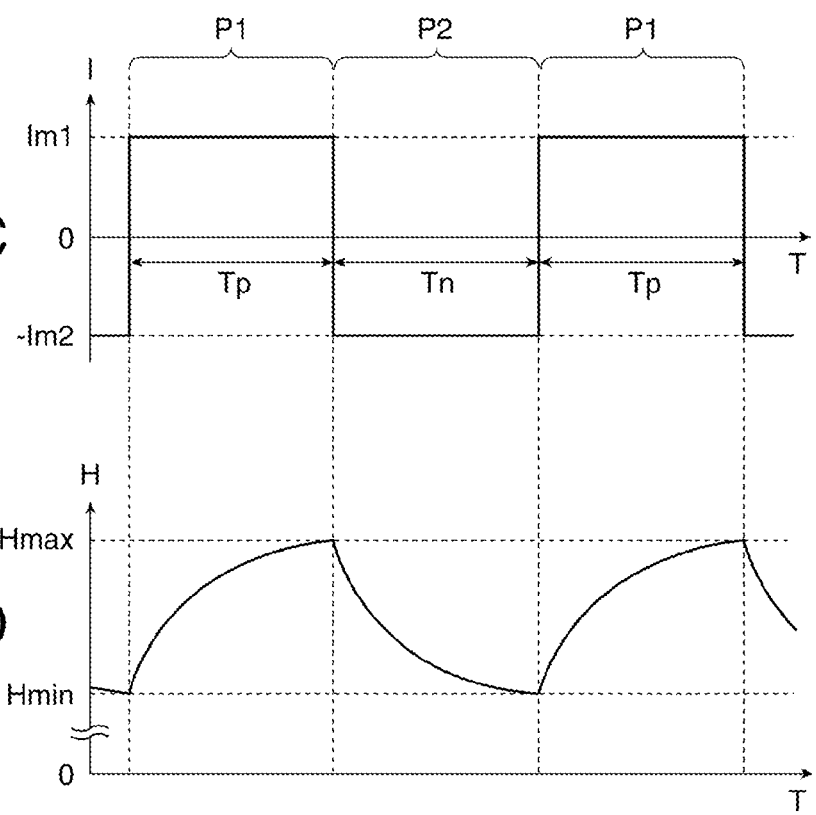
FIG. 5C
FIG. 5D

| DRIVING VOLTAGE(V) | HOLDING TIME min(sec) | HOLDING TIME max(sec) | DUTY RATIO MIN(%) | DUTY RATIO MAX(%) | FREQUENCY MIN(Hz) | FREQUENCY MAX(Hz) | OVERLAPPING RATIO MIN(%) | OVERLAPPING RATIO MAX(%) | NUMBER OF CYCLES MIN (FREQUENCY) | NUMBER OF CYCLES MAX (FREQUENCY) |
|---|---|---|---|---|---|---|---|---|---|---|
| EQUAL TO OR MORE THAN 55 LESS THAN 70 | 0.0018 | 0.0044 | 40 | 60 | 135 | 220 | -5 | 0 | 100 | 1000 |
| EQUAL TO OR MORE THAN 70 LESS THAN 90 | 0.0024 | 0.0300 | 40 | 60 | 20 | 165 | 0 | 10 | 5 | 100 |
| EQUAL TO OR MORE THAN 90 LESS THAN 110 | 0.0011 | 0.0156 | 30 | 70 | 45 | 280 | 5 | 15 | 1 | 10 |
| EQUAL TO OR MORE THAN 110 LESS THAN 130 | 0.0004 | 0.0077 | 15 | 85 | 110 | 360 | 10 | 20 | 1 | 1 |

FIG. 6A

| DRIVING VOLTAGE(V) | HOLDING TIME min(sec) | HOLDING TIME max(sec) | DUTY RATIO MIN(%) | DUTY RATIO MAX(%) | FREQUENCY MIN(Hz) | FREQUENCY MAX(Hz) | OVERLAPPING RATIO MIN(%) | OVERLAPPING RATIO MAX(%) | NUMBER OF CYCLES MIN (FREQUENCY) | NUMBER OF CYCLES MAX (FREQUENCY) |
|---|---|---|---|---|---|---|---|---|---|---|
| EQUAL TO OR MORE THAN 55 LESS THAN 70 | 0.0036 | 0.0086 | 40 | 60 | 70 | 110 | -5 | 0 | 10 | 1000 |
| EQUAL TO OR MORE THAN 70 LESS THAN 90 | 0.0014 | 0.0100 | 30 | 70 | 70 | 220 | 5 | 10 | 1 | 50 |
| EQUAL TO OR MORE THAN 90 LESS THAN 110 | 0.0007 | 0.080 | 20 | 80 | 100 | 280 | 10 | 15 | 1 | 10 |
| EQUAL TO OR MORE THAN 110 LESS THAN 130 | 0.0003 | 0.0064 | 10 | 90 | 140 | 400 | 15 | 20 | 1 | 1 |

FIG. 6B

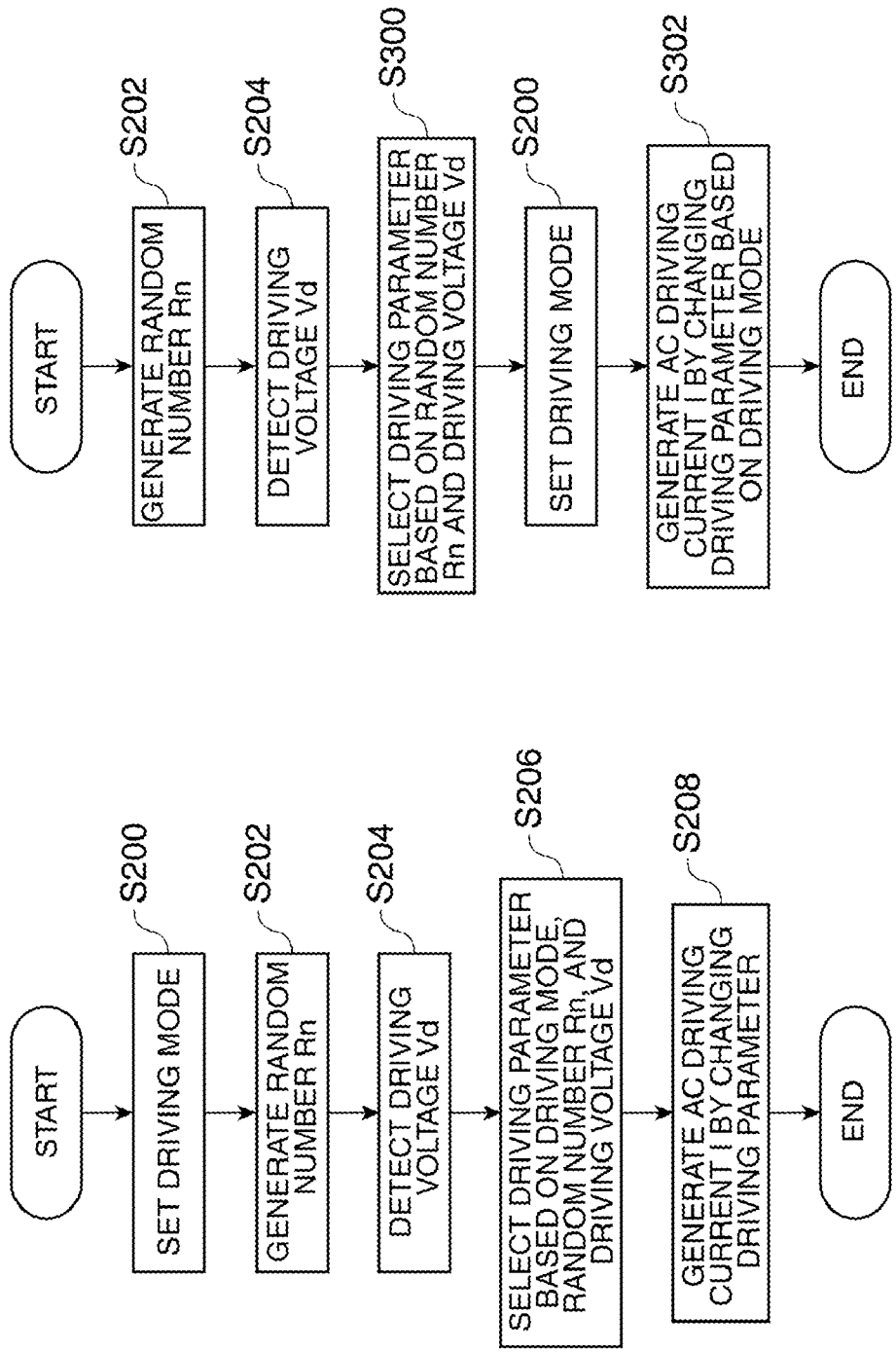

DISCHARGE LAMP LIGHTING DEVICE, METHOD OF DRIVING DISCHARGE LAMP, AND PROJECTOR

CROSS-REFERENCE

The present application claims priority from Japanese Patent Application No. 2009-027162 filed on Feb. 9, 2009 which is hereby incorporated by reference in its entirety.

BACKGROUND

As a light source of a projector, a discharge lamp such as a high-pressure mercury lamp or metal halide lamp may be used. In such a discharge lamp, the melting performance decreases in accordance with the wear of electrodes due to discharge, the progress of crystallization of the electrodes accompanied by an elapse of the accumulated lighting time, or the like, whereby the shapes of the electrodes change. In addition, when a plurality of protrusions is grown in the front end portions of the electrodes or electrode main bodies are worn irregularly, a shift of an arc starting point and a change in the arc length occur. These phenomena cause reduction in luminance of the discharge lamp and shorten the life of the discharge lamp, which are not desirable.

As a method of solving the above-described problems, a discharge lamp lighting device that drives a discharge lamp by using AC currents having different frequencies is known.

However, when the discharge lamp is driven by using AC currents having different frequencies as in JP-A-2006-59790, a steady convection current is formed in accordance with light emission inside the discharge lamp. Accordingly, uneven segregation of electrode materials occurs. Therefore, there is a problem in that abnormal discharge may occur at the time of start of lighting and damages in a sealing body (glass container) forming a discharge space may occur.

In addition, by only changing the frequencies, the melting states of the front ends of the electrodes are not sufficient for preventing unevenness, and protrusions formed on the front ends of the electrodes may be deformed. In addition, in a case where the electrodes are excessively melted for maintaining the shapes of the protrusions, the electrode materials excessively vaporize, whereby a problem such as blackening may occur.

SUMMARY

Various embodiments of the disclosure provide a discharge lamp lighting device, a method of driving a discharge lamp, and a projector capable of preventing uneven segregation of electrode materials by suppressing formation of a steady convention current inside the discharge lamp and suppressing deformation of electrode protrusions.

According to a first aspect, there is provided a discharge lamp lighting device including a discharge lamp driving unit that drives a discharge lamp by supplying an AC driving current to the discharge lamp; a memory unit that stores at least a holding time, in which the AC driving current continues to have a same polarity, as a driving parameter that defines the AC driving current therein; and a control unit that controls the discharge lamp driving unit based on the driving parameter that is stored in the memory unit. The control unit selects a holding time value from values in a first range at a predetermined probability based on a predetermined time condition and controls the discharge lamp driving unit based on the selected holding time value.

The predetermined time condition, for example, may be a time when each predetermined number of cycles of the AC driving current elapses or a time when each predetermined time elapses.

The predetermined probability may have, for example, uniform distribution or specific distribution in the first range.

According to the above-described discharge lamp lighting device, a holding time in which an AC driving current for driving the discharge lamp continues to have a same polarity statistically (randomly) changes. Accordingly, formation of a steady convection current inside the discharge lamp may be suppressed, whereby uneven wear of the electrodes or uneven segregation of electrode materials may be prevented.

In addition, energy supplied between the electrodes of the discharge lamp statistically (randomly) changes. Accordingly, unevenness of the melting states of the electrode front ends is suppressed, whereby the deformation of the protrusions formed on the electrode front ends may be suppressed.

According to a second aspect, there is provided a discharge lamp lighting device including a discharge lamp driving unit that drives a discharge lamp by supplying an AC driving current to the discharge lamp; a memory unit that stores at least a duty ratio of the AC driving current as a driving parameter that defines the AC driving current therein; and a control unit that controls the discharge lamp driving unit based on the driving parameter that is stored in the memory unit. The control unit selects a duty ratio value of the AC driving current from values in a second range at a predetermined probability based on a predetermined time condition and controls the discharge lamp driving unit based on the selected duty ratio value of the AC driving current.

The duty ratio is a ratio of the length of a first polarity section to the length of one cycle of the AC driving current that repeats to alternately switch between the first polarity and the second polarity.

According to the above-described discharge lamp lighting device, a duty ratio of the AC driving current for driving the discharge lamp statistically (randomly) changes. Accordingly, formation of a steady convection current inside the discharge lamp may be suppressed, whereby uneven wear of the electrodes or uneven segregation of electrode materials may be prevented.

In addition, energy supplied between the electrodes of the discharge lamp statistically (randomly) changes. Accordingly, unevenness of the melting states of the electrode front ends may be suppressed, whereby the deformation of the protrusions formed on the electrode front ends may be suppressed.

In the above-described discharge lamp lighting device, it may be configured that the memory unit stores a frequency of the AC driving current as a driving parameter that defines the AC driving current, and the control unit selects a frequency value of the AC driving current from values in a third range at a predetermined probability based on a predetermined time condition and controls the discharge lamp driving unit based on the selected frequency value of the AC driving current.

In the above-described discharge lamp lighting device, it may be configured that the memory unit stores a waveform of the AC driving current as a driving parameter that defines the AC driving current, and the control unit selects a waveform of the AC driving current from a plurality of selectable waveform patterns at a predetermined probability based on a predetermined time condition and controls the discharge lamp driving unit based on the selected waveform of the AC driving current.

The above-described discharge lamp lighting device may further include an operation detecting unit including a voltage detecting unit that detects a driving voltage of the discharge lamp, and the control unit sets at least one of the predetermined time condition, the first range, the second range, the third range, and the plurality of selectable waveform patterns based on the driving voltage that is detected by the voltage detecting unit.

In the above-described discharge lamp lighting device, the control unit may have a plurality of driving modes for driving the discharge lamp with different driving power values and sets at least one of the predetermined time condition, the first range, the second range, the third range, and the plurality of selectable waveform patterns based on the driving mode.

In the above-described discharge lamp lighting device, the discharge lamp driving unit may include: a power control circuit that generates discharge lamp driving power; and an AC converter circuit that generates and outputs the AC driving current supplied to the discharge lamp by inverting the polarity of a DC current output from the power control circuit at a predetermined timing. In such case, the control unit controls the discharge lamp driving unit by performing at least one of an AC conversion control operation that controls a polarity inverting timing of the AC driving current for the AC converter circuit and a current control operation that controls a current value of the DC current output from the power control circuit to the power control circuit.

According to a third aspect, there is provided a method of driving a discharge lamp that is lighted in accordance with supply of an AC driving current to the discharge lamp. The method includes selecting a holding time value from values in a first range at a predetermined probability based on a predetermined time condition; and driving the discharge lamp based on the selected holding time value.

According to a fourth aspect, there is provided a method of driving a discharge lamp that is lighted in accordance with supply of an AC driving current to the discharge lamp. The method includes selecting a duty ratio value of the AC driving current from a second range at a predetermined probability based on a predetermined time condition; and driving the discharge lamp based on the selected duty ratio value of the AC driving current.

The above-described method may further include selecting a frequency value of the AC driving current from values in a third range at a predetermined probability based on a predetermined time condition; and driving the discharge lamp based on the selected frequency value of the AC driving current.

The above-described method may further include selecting a waveform of the AC driving current from a plurality of selectable waveform patterns at a predetermined probability based on a predetermined time condition; and driving the discharge lamp based on the selected waveform of the AC driving current.

The above-described method may further include detecting a driving voltage of the discharge lamp; and setting at least one of the first range, the second range, the third range, and the plurality of selectable waveform patterns based on the driving voltage of the discharge lamp.

The above-described method may further include selecting one from a plurality of driving modes for driving the discharge lamp with different driving power values; and setting at least one of the first range, the second range, the third range, and the plurality of selectable waveform patterns based on the selected driving mode.

According to a fifth aspect, there is provided a projector including the above-described discharge lamp lighting device.

BRIEF DESCRIPTION OF THE DRAWINGS

Non-limiting and non-exhaustive embodiments of the present disclosure will be described with reference to the accompanying drawings, wherein like numbers reference like elements.

FIGS. 5A to 5D are explanatory diagrams illustrating the relation between the polarity of driving power supplied to a discharge lamp and the temperature of electrodes.

FIGS. 6A and 6B are tables illustrating an example of relation between a driving voltage and driving parameters.

FIG. 14 is a flowchart illustrating an example of a procedure for generating an AC driving current by changing driving parameters based on a driving mode.

FIG. 15 is a flowchart illustrating an example of the procedure for generating an AC driving current by changing a driving parameter based on a driving mode.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

1. Optical System of Projector

Figure 1:
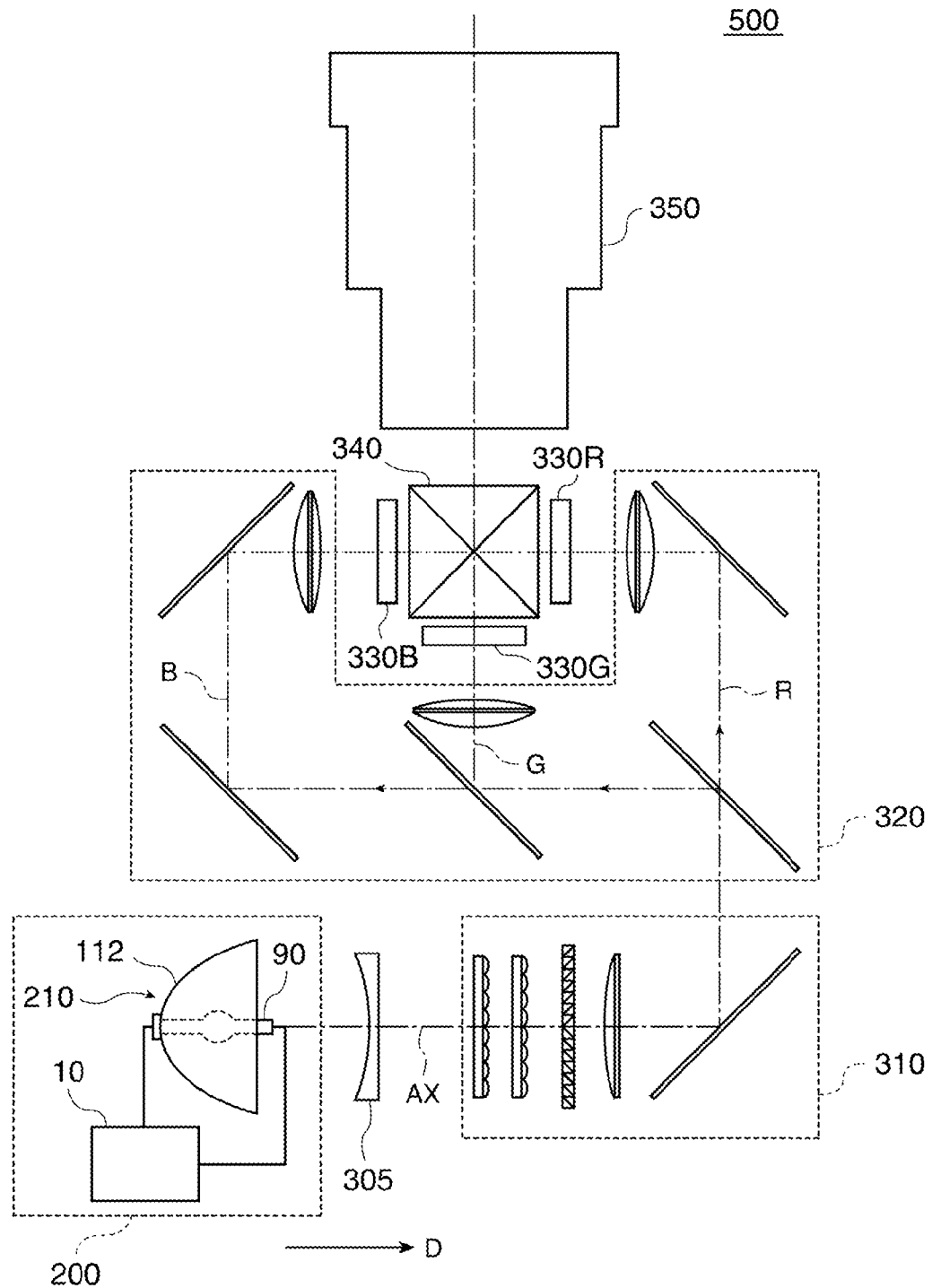
FIG. 1 is an explanatory diagram illustrating a projector according to an embodiment.

FIG. 1 is an explanatory diagram showing a projector 500 according to one embodiment of the disclosure. The projector 500 has a light source device 200, a parallelizing lens 305, an illumination optical system 310, a color separation optical system 320, three liquid crystal light valves 330R, 330G and 330B, a cross dichroic prism 340, and a projection optical system 350.

The light source device 200 has a light source unit 210 and a discharge lamp lighting device 10. The light source unit 210 has a main reflection mirror 112, a sub reflection mirror 50, and a discharge lamp 90. The discharge lamp lighting device 10 supplies power to the discharge lamp 90 and thus lights the discharge lamp 90. The main reflection mirror 112 reflects the light emitted from the discharge lamp 90 toward an irradiation direction D. The irradiation direction D is parallel to an optical axis AX. The light from the light source unit 210 passes through the parallelizing lens 305 and is incident on the illumination optical system 310. This parallelizing lens 305 parallelizes the light emitted from the light source unit 210.

The illumination optical system 310 equalizes the illuminance of the light, which is emitted from the light source device 200, at the liquid crystal light valves 330R, 330G and 330B. The illumination optical system 310 also aligns the polarization direction of the light emitted from the light source device 200 into one direction. The reason for this is to utilize effectively the light emitted from the light source device 200 at the liquid crystal light valves 330R, 330G and 330B. The light with its illuminance distribution and polarization direction adjusted is incident on the color separation optical system 320. The color separation optical system 320 separates the incident light into three color light beams of red (R), green (G), and blue (B). The three color light beams are modulated by the liquid crystal light valves 330R, 330G and 330B corresponding to their respective colors. The liquid crystal light valves 330R, 330G, and 330B have liquid crystal panels 560R, 560G, and 560B and polarizing plates arranged on the light incident side and light exiting side of the liquid crystal panels 560R, 560G, and 560B. The modulated three color light beams are combined by the cross dichroic prism 340. Then, the combined light is incident on the projection optical system 350. The projection optical system 350 projects the incident light to a screen not shown in the figure. Accordingly, an image is displayed on the screen.

As the configuration of each of the parallelizing lens 305, the illumination optical system 310, the color separation optical system 320, the cross dichroic prism 340, and the projection optical system 350, various known configurations can be employed.

Figure 2:
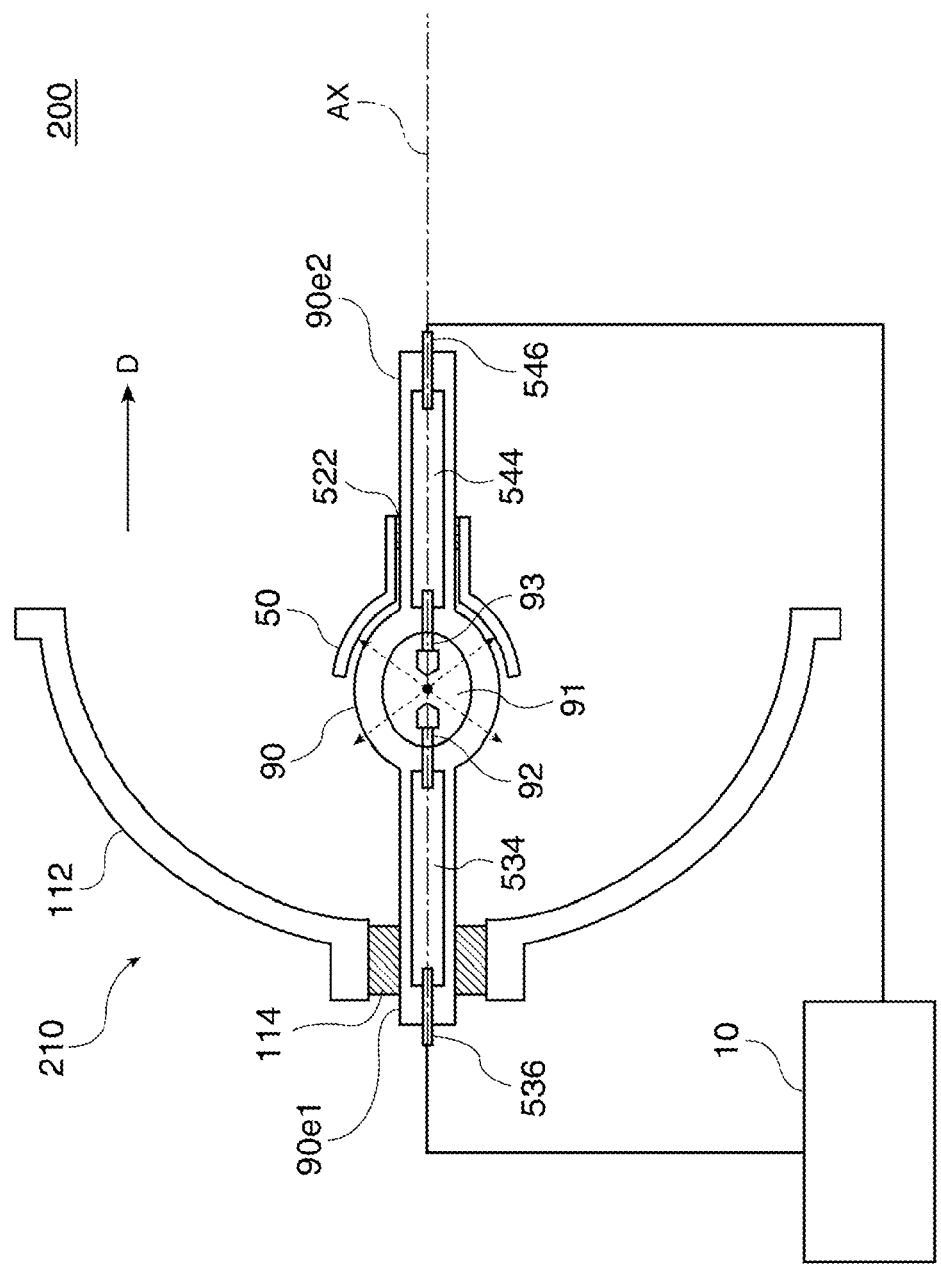
FIG. 2 is an explanatory diagram illustrating the configuration of a light source device.

FIG. 2 is an explanatory diagram showing the configuration of the light source device 200. The light source device 200 has the light source unit 210 and the discharge lamp lighting device 10. FIG. 2 shows a cross-sectional view of the light source unit 210. The light source unit 210 has the main reflection mirror 112, the discharge lamp 90, and a sub reflection mirror 50.

The discharge lamp 90 has a bar shape extending along the irradiation direction D from a first edge $90e1$ to a second edge $90e2$. The material of the discharge lamp 90 is a light-transmissive material such as quartz glass. A center portion of the discharge lamp 90 is expanded in a spherical shape, in which a discharge space 91 is formed. A gas as a discharge medium containing rare gas, metal halide and the like is sealed in the discharge space 91.

In the discharge space 91, two electrodes 92 and 93 are protruded from the discharge lamp 90. The first electrode 92 is arranged on the first edge $90e1$ side in the discharge space 91 and the second electrode 93 is arranged on the second edge $90e2$ side in the discharge space 91. These electrodes 92 and 93 have a bar shape extending along the optical axis AX. In the discharge space 91, the front end portions (also referred to as "discharge tips") of the electrodes 92 and 93 face each other at a predetermined distance from each other. The material of the electrodes 92 and 93 is a metal such as tungsten.

A first terminal 536 is provided at the first edge $90e1$ of the discharge lamp 90. The first terminal 536 and the first electrode 92 are electrically connected to each other by a conductive member 534 passing through the discharge lamp 90. Similarly, a second terminal 546 is provided at the second edge $90e2$ of the discharge lamp 90. The second terminal 546 and the second electrode 93 are electrically connected to each other by a conductive member 544 passing through the discharge lamp 90. The material of the terminals 536 and 546 is a metal such as tungsten. As the conductive members 534 and 544, for example, molybdenum foils are used.

The terminals 536 and 546 are connected to the discharge lamp lighting device 10. The discharge lamp lighting device 10 supplies an AC current to these terminals 536 and 546. As a result, arc discharge occurs between the two electrodes 92 and 93. Light (discharge light) generated by the arc discharge is radiated in all directions from the discharge position, as indicated by dotted arrows.

The main reflection mirror 112 is fixed at the first edge $90e1$ of the discharge lamp 90 by a fixing member 114. The reflection surface (the surface on the discharge lamp 90 side) of the main reflection mirror 112 has a rotated parabola shape. The main reflection mirror 112 reflects the discharge light toward the irradiation direction D. The shape of the reflection surface of the main reflection mirror 112 is not limited to a spheroidal shape. Thus, various shapes that reflect the discharge light in the irradiation direction D can be employed. For example, the shape of a paraboloid of revolution may be employed as the shape of the reflection surface. In such case, the main reflection mirror 112 can convert the discharge light into light substantially parallel to the optical axis AX. Therefore, the parallelizing lens 305 can be omitted.

The sub reflection mirror 50 is fixed to the second edge $90e2$ side of the discharge lamp 90 by a fixing member 522. The reflection surface (the surface on the discharge lamp 90 side) of the sub reflection mirror 50 has a spherical shape surrounding the second edge $90e2$ side of the discharge space 91. The sub reflection mirror 50 reflects the discharge light toward the main reflection mirror 112. Accordingly, the use efficiency of the light radiated from the discharge space 91 can be increased.

As the material of the fixing members 114 and 522, an arbitrary heat-resistant material that can withstand heat dissipation of the discharge lamp 90 (for example, an inorganic adhesive agent) can be employed. The method of fixing the arrangement of the main reflection mirror 112, the sub reflection mirror 50, and the discharge lamp 90 is not limited to the fixing of the main reflection mirror 112 and the sub reflection mirror 50 to the discharge lamp 90, and any arbitrary method can be employed. For example, the discharge lamp 90 and the main reflection mirror 112 may be separately fixed to the casing (not shown) of the projector. This also applies to the sub reflection mirror 50.

Figure 3:
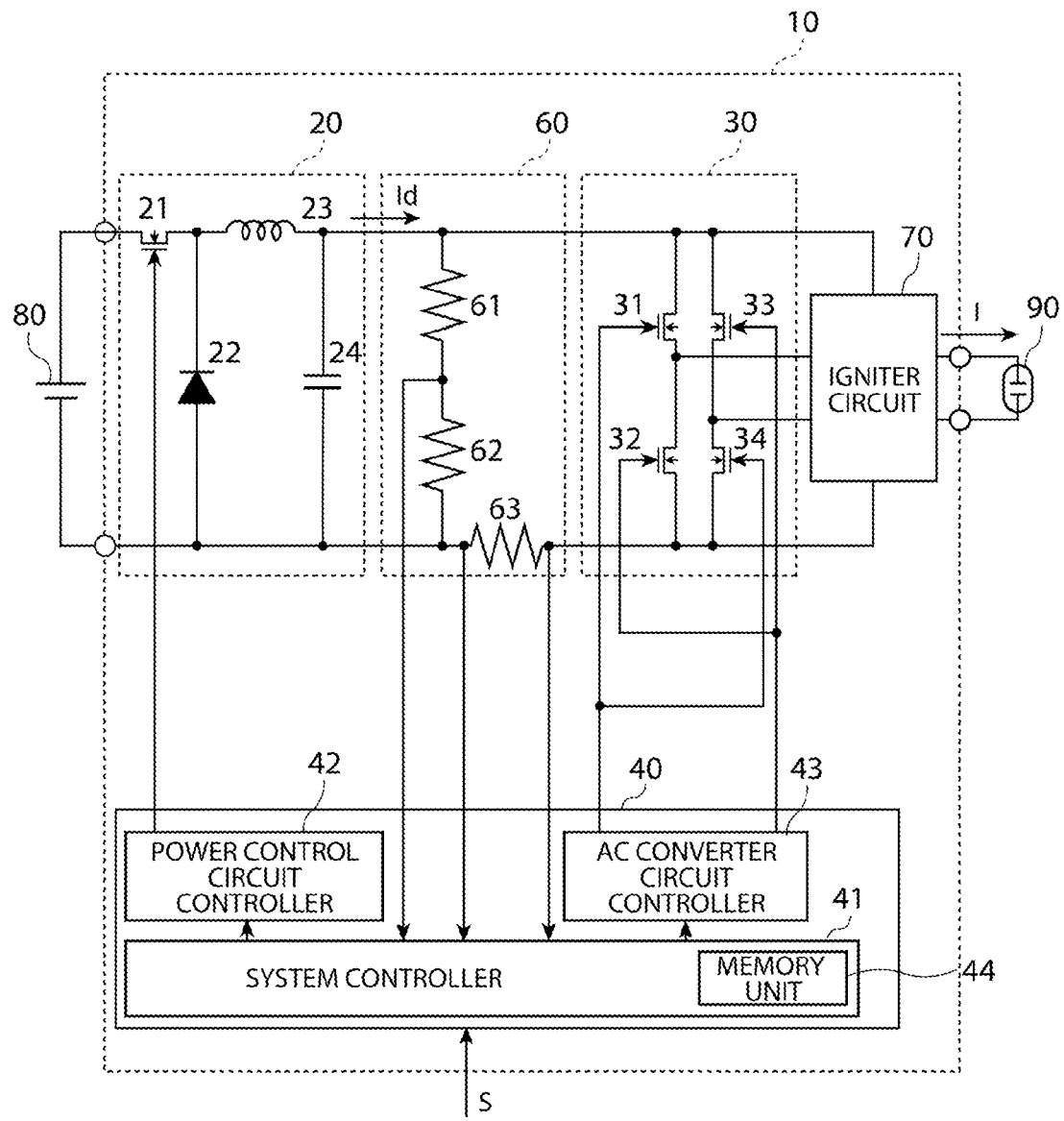
FIG. 3 is a circuit diagram of a discharge lamp lighting device according to an embodiment.

2. Discharge Lamp Lighting Device According to First Embodiment (1) Configuration of Discharge Lamp Lighting Device FIG. 3 shows an exemplary circuit diagram of the discharge lamp lighting device according to this embodiment.

The discharge lamp lighting device 10 includes a power control circuit 20. The power control circuit 20 generates driving power supplied to the discharge lamp 90. In this embodiment, the power control circuit 20 is formed by a down chopper circuit that takes a DC power source 80 as its input, then lowers the input voltage, and outputs a DC current Id.

The power control circuit 20 may be configured to include a switch element 21, a diode 22, a coil 23, and a capacitor 24. The switch element 21 may be formed, for example, by a transistor. In this embodiment, one end of the switch element 21 is connected to the positive voltage side of the DC power source 80, and the other end is connected to the cathode terminal of the diode 22 and one end of the coil 23. Moreover, one end of the capacitor 24 is connected to the other end of the coil 23, and the other end of the capacitor 24 is connected to the anode terminal of the diode 22 and the negative voltage side of the DC power source 80. To the control terminal of the switch element 21, a current control signal is input from a control unit 40, whereby the ON state or the OFF state of the switch element 21 is controlled. As the current control signal, for example, a PWM (Pulse Width Modulation) control signal may be used.

Here, when the switch element 21 is turned on, a current flows through the coil 23, and energy is accumulated in the coil 23. Thereafter, when the switch element 21 is turned off, the energy accumulated in the coil 23 is released in a path passing through the capacitor 24 and the diode 22. As a result, a DC current Id is generated, which corresponds to the proportion of a time when the switch element 21 is turned on.

The discharge lamp lighting device 10 includes an AC converter circuit 30. The AC converter circuit 30 takes the DC current Id, which is output from the power control circuit 20, as its input and then inverts the polarity at predetermined timings, thereby generating and outputting a AC driving current I for driving the discharge lamp having an arbitrary duty ratio and an arbitrary frequency. In this embodiment, the AC converter circuit 30 is formed by an inverter bridge circuit (full-bridge circuit).

The AC converter circuit 30 is configured to include, for example, first to fourth switch elements 31 to 34 such as transistors. The AC converter circuit 30 is configured by connecting first and second switch elements 31 and 32, which are connected in series, and the third and fourth switch elements 33 and 34, which are connected in series, in parallel. An AC conversion control signal from the control unit 40 is input to each of the control terminals of the first to fourth switch elements 31 to 34, and accordingly, the ON states or the OFF states of the first to fourth switch elements 31 to 34 are controlled.

The AC converter circuit 30 alternately inverts the polarity of the DC current Id output from the power control circuit 20 by repeating alternately turning on and off the first and fourth switch elements 31 and 34 and the second and third switch elements 32 and 33. Thus, the AC converter circuit 30 generates and outputs an AC driving current I having a controlled duty ratio and a controlled frequency from a common connection point of the first and second switch elements 31 and 32 and a common connection point of the third and fourth switch elements 33 and 34.

In other words, the second and third switch elements 32 and 33 are controlled to be turned off when the first and fourth switch elements 31 and 34 are turned on, and the second and third switch elements 32 and 33 are controlled to be turned on when the first and fourth switch elements 31 and 34 are turned off. Therefore, when the first and fourth switch elements 31 and 34 are turned on, an AC driving current I is generated which flows from the one end of the capacitor 24 to the first switch element 31, the discharge lamp 90 and the fourth switch element 34 in that order. When the second and third switch elements 32 and 33 are turned on, an AC driving current I is generated which flows from the one end of the capacitor 24 to the third switch element 33, the discharge lamp 90 and the second switch element 32 in that order.

In this embodiment, the power control circuit 20 and the AC converter circuit 30 correspond to a discharge lamp driving unit.

The discharge lamp lighting device 10 includes the control unit 40. The control unit 40 controls the power control circuit 20 and the AC converter circuit 30, thereby controlling the current value, the duty ratio, the frequency, and the like of the AC driving current I. The control unit 40 carries out AC conversion control processing for the AC converter circuit 30, which controls the duty ratio, the frequency, and the like by using the polarity-inversion timings of the AC driving current I. In addition, the control unit 40 also carries out current control processing for the power control circuit 20, which controls the current value of the output DC current Id.

In addition, the control unit 40 may be configured to carry out a current control processing in which a mode setting signal S is received from the outside, and an average value of the DC current Id output from the power control circuit 20 is set as a current value corresponding to the mode setting signal S. The mode setting signal S, for example, may be a signal that is generated based on a user's mode switching operation (for example, a mode switching operation between a high-luminance mode for high-power driving and a long-life mode for low-power driving).

The configuration of the control unit 40 is not particularly limited. However, in this embodiment, the control unit 40 is configured to include a system controller 41, a power control circuit controller 42, and an AC converter circuit controller 43. A part of the control unit 40 or its entirety may be formed by a semiconductor integrated circuit.

The system controller 41 controls the power control circuit controller 42 and the AC converter circuit controller 43 and thereby controls the power control circuit 20 and the AC converter circuit 30. The system controller 41 may be configured to control the power control circuit controller 42 and the AC converter circuit controller 43 in accordance with the driving voltage Vd and the AC driving current I that are detected by an operation detecting unit 60 disposed inside the discharge lamp lighting device 10, which will be described later.

In this embodiment, the system controller 41 is configured to include a memory unit 44. The memory unit 44 may also be arranged separately from the system controller 41.

The system controller 41 may be configured to control the power control circuit 20 and the AC converter circuit 30 based on information stored in the memory unit 44. In the memory unit 44, for example, information on driving parameters such as a holding time in which the polarity of the AC driving current I continues to be the same, and the current value, the duty ratio, the frequency, the waveform, and the like of the AC driving current I may be stored.

The power control circuit controller 42 outputs a current control signal to the power control circuit 20 based on a control signal output from the system controller 41, thereby controlling the power control circuit 20.

The AC converter circuit controller 43 outputs an AC conversion control signal to the AC converter circuit 30 based on a control signal output from the system controller 41, thereby controlling the AC converter circuit 30.

Figure 4:
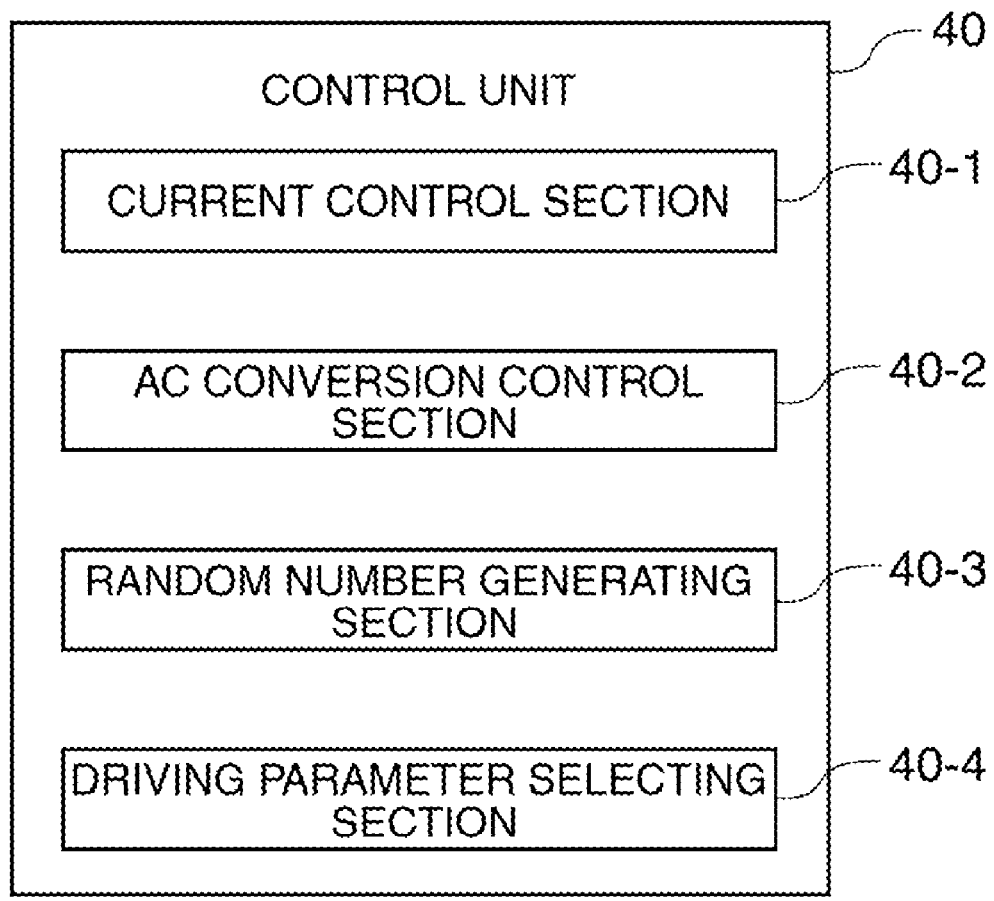
FIG. 4 is an explanatory diagram illustrating the configuration of a control unit according to an embodiment.

In addition, the control unit 40 may be implemented by a dedicated circuit for performing the above-described control processes and various control processes for processes to be described later. However, for example, the control unit 40 may be configured by a CPU (Central Processing Unit) that executes a control program stored in the memory unit 44 or the like so as to serve as a computer for performing various control processes for the above-described processes. In other words, as shown in FIG. 4, the control unit 40 may be configured by a control program for serving as a current control section 40-1 that controls the power control circuit 20, an AC conversion control section 40-2 that controls the AC converter circuit 30, a random number generating section 40-3 that generates or selects a random number, and a driving parameter selecting section 40-4 that selects driving parameters.

The discharge lamp lighting device 10 may include the operation detecting unit 60. For example, the operation detecting unit 60 may be configured to include a voltage detecting unit detecting a driving voltage Vd of the discharge lamp 90 and outputting driving voltage information or a current detection section detecting the AC driving current I and outputting driving current information. In this embodiment, the operation detecting unit 60 is configured to include the first to third resistors 61 to 63.

In this embodiment, the voltage detection section detects the driving voltage Vd in accordance with a voltage divided by the first and second resistors 61 and 62, which are connected to the discharge lamp 90 in parallel and connected in series to each other. In addition, in this embodiment, the current detection section detects the AC driving current I in accordance with a voltage applied to the third resistor 63 that is connected to the discharge lamp 90 in series.

The discharge lamp lighting device 10 may include an igniter circuit 70. The igniter circuit 70 operates only when lighting of the discharge lamp 90 starts. When the lighting of the discharge lamp 90 starts, the igniter circuit 70 supplies, between the electrodes of the discharge lamp 90, a high voltage (a higher voltage than that used in normal control operation) that is necessary to cause dielectric breakdown between the electrodes of the discharge lamp 90 and thus form a discharge path. In this embodiment, the igniter circuit 70 is connected to the discharge lamp 90 in parallel.

FIGS. 5A to FIG. 5D are explanatory diagrams showing the relation between the polarity of driving power supplied to the discharge lamp 90 and the temperature of the electrodes.

FIG. 5A and FIG. 5B show the operation states of the two electrodes 92 and 93. In the figures, the front end portions of the two electrodes 92 and 93 are shown. Protrusions 552p and 562p are arranged in the front end portions of the electrodes 92 and 93, respectively. Discharge occurs between these protrusions 552p and 562p. In this embodiment, shift of the discharge position (arc position) in each of the electrodes 92 and 93 can be restrained, compared to a case where a protrusion is not disposed. However, such protrusions may be omitted.

FIG. 5A shows a first polarity state P1 in which the first electrode 92 operates as the anode and the second electrode 93 operates as the cathode. In the first polarity state P1, discharge causes electrons to move from the second electrode 93 (cathode) to the first electrode 92 (anode). Electrons are released from the cathode (second electrode 93). The electrons released from the cathode (second electrode 93) collide with the front end of the anode (first electrode 92). This collision generates heat, and the temperature of the front end (protrusion 552p) of the anode (first electrode 92) rises.

FIG. 5B shows a second polarity state P2 in which the first electrode 92 operates as the cathode and the second electrode 93 operates as the anode. In the second polarity state P2, contrary to the first polarity state P1, electrons move from the first electrode 92 to the second electrode 93. As a result, the temperature of the front end (protrusion 562p) of the second electrode 93 rises.

In this manner, the temperature of the anode tends to be higher than that of the cathode. The continued state where the temperature of one electrode is higher than that of the other electrode can cause various problems. For example, in a case where the front end of the electrode of the higher temperature is melted excessively, unintended deformation of the electrode can occur. As a result, the arc length may deviate from its proper value. In contrast, when the front end of the electrode of the lower temperature is melted insufficiently, small recesses and protrusions generated in the front end can remain without being melted. As a result, a so-called arc jump may occur (the arc position is unstable and shifts).

As a technique for suppressing such problems, AC driving in which the polarity of each electrode is alternated repeatedly can be used. FIG. 5C is a timing chart showing an AC driving current (driving signal) supplied to the discharge lamp 90 (FIG. 2). In the figure, the horizontal axis represents time T, and the vertical axis represents the current value of the AC driving current I. The AC driving current I is a current flowing through the discharge lamp 90. A positive value of the AC driving current represents the first polarity state P1, and a negative value represents the second polarity state P2. In the example shown in FIG. 5C, a rectangular-wave AC current is used. The first polarity state P1 and the second polarity state P2 are alternately repeated. Here, a first polarity section Tp represents a time period during which the first polarity state P1 continues, and a second polarity section Tn represents a time period during which the second polarity state P2 continues. The average current value in the first polarity section Tp is Im1, and the average current value in the second polarity section Tn is −Im2. In addition, the driving frequency can be experimentally determined in accordance with the characteristics of the discharge lamp 90 (for example, a value in the range of 30 Hz to 1 kHz is used). Similarly, the other values Im1, −Im2, Tp, and Tn can be determined experimentally.

FIG. 5D is a timing chart showing a temperature change in the first electrode 92. In the figure, the horizontal axis represents time T, and the vertical axis represents temperature H. The temperature H of the first electrode 92 rises in the first polarity state P1. In contrast, the temperature H of the first electrode 92 falls in the second polarity state P2. Since the first polarity state P1 and the second polarity state P2 are repeated, the temperature H changes periodically between a minimum value Hmin and a maximum value Hmax. Although not shown in the figure, the temperature of the second electrode 93 changes to the reverse phase of the temperature H of the first electrode 92. In other words, the temperature of the second electrode 93 falls in the first polarity state P1, and the temperature of the second electrode 93 rises in the second polarity state P2.

In the first polarity state P1, the front end of the first electrode 92 (protrusion 552p) melts, and therefore the front end of the first electrode 92 (protrusion 552p) becomes smooth. Accordingly, shift of the discharge position in the first electrode 92 can be suppressed. In addition, the temperature of the front end of the second electrode 93 (protrusion 562p) falls, and therefore excessive melting of the second electrode 93 (protrusion 562p) is suppressed. Accordingly, unintended deformation of the electrode can be suppressed. In the second polarity state P2, the states of the first electrode 92 and the second electrode 93 are reversed. Thus, as the two states P1 and P2 are repeated, the problems in the two electrodes 92 and 93 can be suppressed.

Now, when the waveform of the current I is symmetrical, that is, when the waveform of the current I satisfies the condition of "|Im1|=|−Im2| and Tp=Tn", the two electrodes 92 and 93 have the same condition of power supplied thereto. Therefore, the temperature difference between the two electrodes 92 and 93 is estimated to be small. However, when driving with such a symmetrical current waveform is continuously maintained, a steady convection current is generated in the discharge space 91, and the electrode material may be deposited or segregated locally in the axial portion of the electrodes and grow in a needle shape. This may cause unintended discharge toward the wall surface of the light-transmissive material surrounding the discharge space 91. Such unintended discharge degrades this inner wall and may cause reduction in the life of the discharge lamp 90. Moreover, when driving with such a symmetrical current waveform is continuously maintained, a constant temperature distribution of the electrodes is continued for a long time. Therefore, asymmetry of the electrodes generated in accordance with a state change over time tends to be further promoted as time elapses.

In addition, when the electrode is heated excessively over a wide range (an arc spot (a hot spot on the surface of the electrode that is generated by arc discharge) becomes large), the shape of the electrode collapses due to excessive melting. In contrast, when the electrode is at excessively low temperature (the arc spot becomes small), the front end of the electrode is not sufficiently melted and cannot be returned to be in a smooth state, that is, the front end of the electrode may be easily deformed. Accordingly, when the uniform state of energy supply to the electrode is continued, the front ends (protrusions 552p and 562p) of the electrodes may be easily deformed into an unintentional shape.

(2) Example of Control of Discharge Lamp Lighting Device

Next, a concrete example of controlling the discharge lamp lighting device 10 according to this embodiment will be described.

The control unit 40 of the discharge lamp lighting device 10 according to this embodiment selects a value of the holding time, in which the polarity of the AC driving current I is continuously maintained to be a same polarity, from values in the first range at a predetermined probability based on a predetermined time condition and controls the discharge lamp driving unit based on the selected value of the holding time.

The holding time is a time period from a polarity-inversion timing of the AC driving current I to a next polarity-inversion timing.

The predetermined time condition, for example, may be a time when each predetermined number of cycles of the AC driving current elapses or a time when each predetermined time elapses. In this embodiment, an example in which the holding time is selected for each ½ cycle for driving will be described.

The predetermined probability, for example, may be a probability having uniform distribution in the first range or a probability having specific distribution (for example, normal distribution). In this embodiment, an example in which the probability has the uniform distribution in the first range will be described.

The control unit 40 may be configured to set the first range based on the driving voltage Vd for the discharge lamp that is detected by the voltage detection section of the operation detecting unit 60.

FIGS. 6A and 6B are tables showing an example of the relation between the driving voltage Vd and the driving parameters. FIG. 6A is relation in a driving mode in which the discharge lamp 90 is driven by relatively high driving power, and FIG. 6B is relation in a driving mode in which the discharge lamp 90 is driven by relatively low driving power.

In FIGS. 6A and 6B, the first column represents a driving voltage Vd. In addition, the second column represents a minimum value of the holding time, and the third column represents a maximum value of the holding time. A range from the minimum value to the maximum value of the holding time corresponding to each driving voltage Vd corresponds to the first range.

Figure 7:
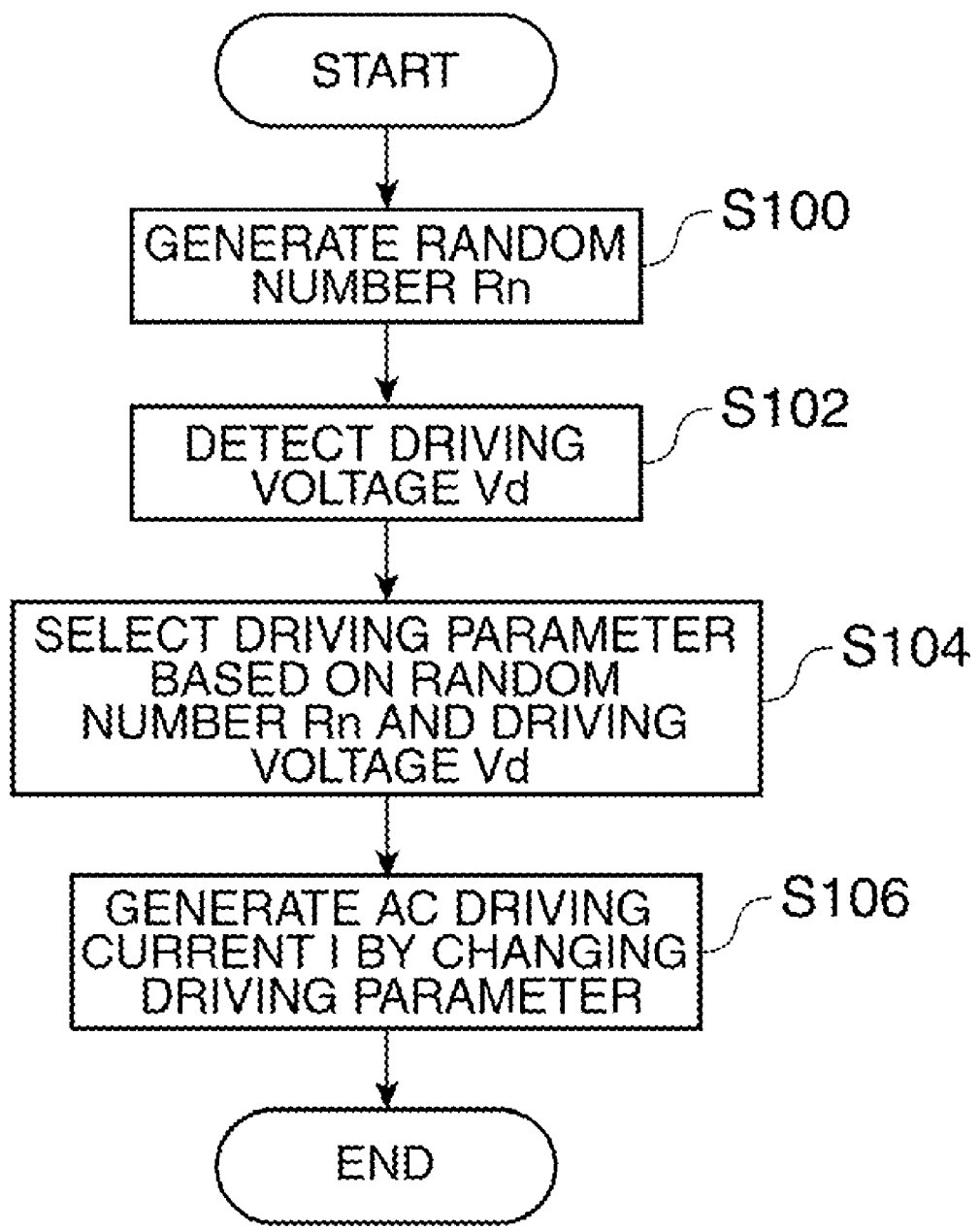
FIG. 7 is a flowchart illustrating an example of a procedure for generating an AC driving current by changing driving parameters.

FIG. 7 is a flowchart showing an example of a procedure for generating an AC driving current I by changing the driving parameters. The procedure shown in FIG. 7 may be performed each time the predetermined time condition is satisfied. Alternatively, the AC driving current may be generated by summing up the waveforms of the AC driving currents I corresponding to a predetermined time (for example, several minutes) by performing the procedure shown in FIG. 7 once.

In FIG. 7, an example in which, in a state in which the AC driving current I is generated based on the existing driving parameters, the driving parameters are changed is shown. In a predetermined period after start of lighting the discharge lamp 90, for example, the AC driving current I may be generated based on the driving parameters that are initially set, or the AC driving current I may be generated based on the driving parameters used in a period right before the previous lights-out.

First, a random number Rn is generated by a random number generating section 40-3 and is selected (Step S100). The random number generating section 40-3 may select a random number Rn from a random number table that is stored in the memory unit 44 or the like in advance. Alternatively, the random number generating section 40-3 may generate a pseudo random number so as to select the random number Rn. In this embodiment, a case where the random number Rn takes one value in the range from "0" to "1", and the random numbers are uniformly distributed will be described. In addition, for example, random numbers (normal random numbers) having a normal distribution may be generated by transforming uniformly-distributed random numbers by using a Box-Muller transform.

Next, a driving voltage Vd is detected by the voltage detecting unit (Step S102). The driving voltage Vd to be detected may be acquired as an average value for a predetermined time (for example, several minutes).

Next, a driving parameter is selected based on the random number Rn and the driving voltage Vd by the driving parameter selecting section 40-4 (Step S104). In this embodiment, as one of the driving parameters, a holding time will be described.

For example, in a case where the driving voltage Vd is 87 V during a period in which the discharge lamp 90 is driven in a driving mode for driving the discharge lamp with relatively high driving power, as shown in FIG. 6A, the first range is 0.0024 second to 0.0044 second. Accordingly, the holding time is selected from values in the above-described first range.

The holding time Tx is calculated by using the following equation, wherein the holding time is denoted by Tx, the lower limit of the first range is denoted by Tmin, and the upper limit of the first range is denoted by Tmax.

$$Tx = Tmin + (Tmax - Tmin) \times Rn$$

For example, in a case where Rn=0.5, Tx=0.0024+(0.0300−0.0024)×0.5=0.0162. The random number Rn is acquired by taking any one value from the range of "0" to "1" and is uniformly distributed. Thus, the holding time Tx is acquired by taking one value from the range of the lower limit to the upper limit of the first range and is distributed at a uniform probability.

After Step S104, the driving parameter is changed to the value selected in S104, and the AC driving current I is generated (Step S106). In this embodiment, by changing the polarity-inversion timing of the AC driving current I for the AC conversion control section 40-2, the AC driving current I of which the holding time is changed can be generated.

Figure 8:
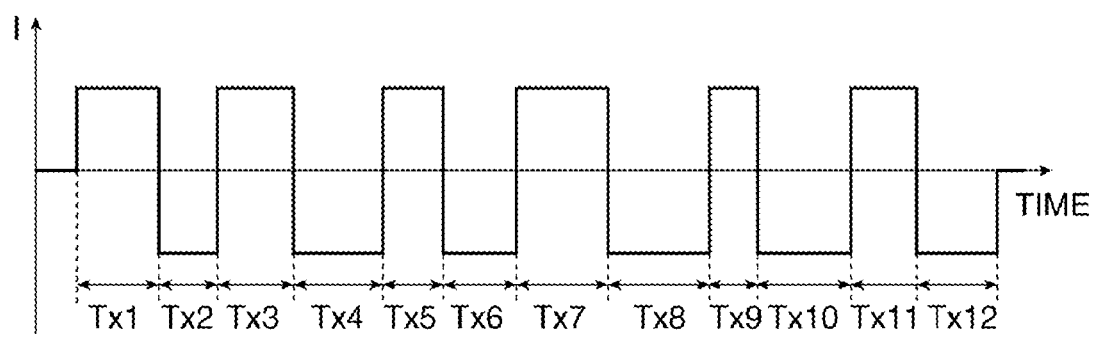
FIG. 8 is a timing chart illustrating an example of the waveform of an AC driving current that is generated in a first embodiment.

FIG. 8 is a timing chart showing an example of the waveform of the AC driving current I that is generated in this embodiment. In the figure, the horizontal axis represents a time, and the vertical axis represents an AC driving current I. In addition, Tx1 to Tx12 are holding times.

As the holding time increases, the temperature of the electrode serving as the anode rises. Thus, the discharge lamp 90 is driven by randomly selecting the holding time Tx, in which the AC driving current I continues to have a same polarity, from the first range at a predetermined probability, whereby the temperature of the electrode changes randomly. Accordingly, formation of a steady convection current within the discharge lamp is suppressed, whereby uneven wear of the electrodes and uneven segregation of the electrode materials can be prevented.

In addition, since the energy supplied between the electrodes of the discharge lamp statistically (randomly) changes, the sizes of arc spots near the protrusions 552p and 562p of the electrodes statistically (randomly) change. Accordingly, the deformation of the protrusions 552p and 562p of the electrodes can be suppressed by suppressing uneven melting states of the electrodes.

In addition, the driving voltage Vd has high correlation with a distance between the electrodes, that is, the degradation states of the electrodes of the discharge lamp 90. Accordingly, by setting the first range based on the driving voltage Vd, the discharge lamp 90 can be driven based on the parameters corresponding to the degradation states of the electrodes.

MODIFIED EXAMPLES

In the above-described embodiment, a case where the waveform of the AC driving current I is a rectangular waveform has been described. However, in addition to the controlling of the holding time Tx of the AC driving current I to be randomly changed, the waveform of the AC driving current I may be controlled to be changed randomly. In other words, it may be configured that the memory unit 44 stores the waveform of the AC driving current I as a driving parameter that defines the AC driving current I, and the control unit 40 selects a waveform of the AC driving current I from a plurality of selectable waveform patterns at a predetermined probability based on a predetermined time condition and controls the discharge lamp driving unit based on the selected waveform of the AC driving current I.

The control unit 40 may be configured to set a plurality of selectable waveform patterns based on the driving voltage Vd of the discharge lamp that is detected by the voltage detection section of the operation detecting unit 60.

Figure 9A:
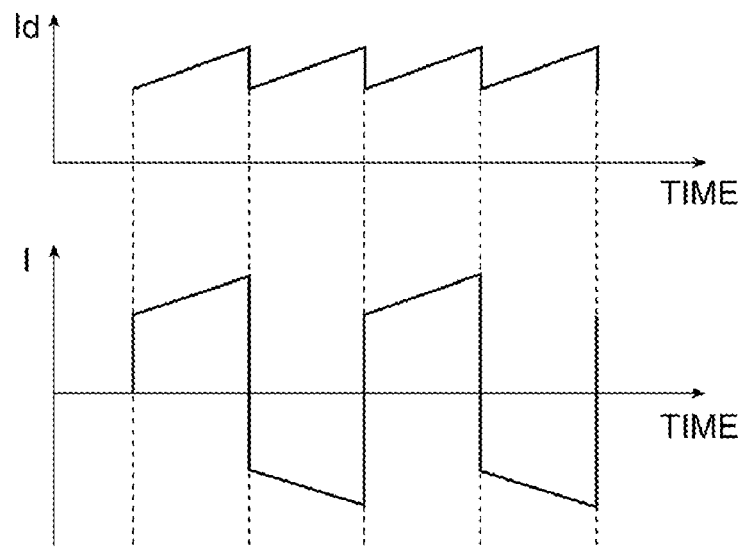
FIGS. 9A and 9B are timing charts illustrating a relation between the waveform of a DC current output from a power control circuit and the waveform of an AC driving current.
Figure 9B:
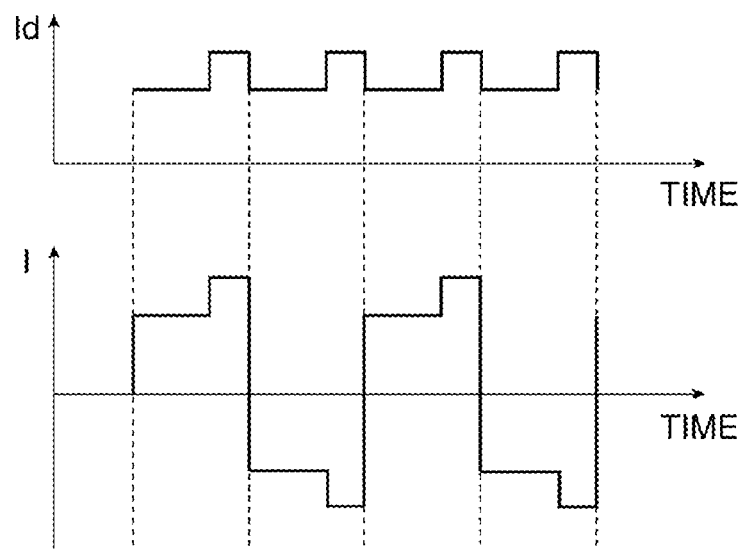

FIGS. 9A and 9B are timing charts showing relation between the waveform of a DC current Id output from the power control circuit 20 and the waveform of the AC driving current I. In both cases, the AC driving current I is generated by inverting the polarity of the DC current Id at predetermined polarity-inversion timings.

FIG. 9A is an example of a waveform (hereinafter, referred to as "waveform A") in a case where the DC current Id is monotonously increased in a straight line pattern by the current control section 40-1 during a half cycle of the AC driving current I. FIG. 9B is an example of a waveform (hereinafter, referred to as "waveform B") in a case where a section, in which the current value of the DC current Id is greater than that in other sections, is arranged on the end side of the half cycle of the AC driving current I by the current control section 40-1.

In this modified example, it may be configured that the waveform of the AC driving current I is selected from among a rectangular waveform, a waveform A, and a waveform B at a predetermined probability, and the discharge lamp driving unit is controlled based on the selected waveform of the AC driving current I.

Here, the overlapping ratio is defined as the following equation.

overlapping ratio=(difference between average value of DC current $Id$ during half cycle of AC driving current $I$ and a final value)/average value of DC current $Id$ In this modified example, it may be configured that the waveform A or the waveform B is changed by changing the overlapping ratio at a predetermined probability, and the discharge lamp driving unit is controlled based on the changed waveform. In addition, in the examples of the waveform. A and the waveform B, the waveforms correspond to a rectangular waveform in a case where the overlapping ratio is 0%. In addition, a case where the overlapping ratio has a negative value corresponds to a case where the DC current Id is monotonously decreased in a straight line pattern during the half cycle of the AC driving current I, for example, for the waveform A.

An example in which the discharge lamp 90 is driven such that the AC driving current I becomes the waveform A, and the overlapping ratio of the waveform A is changed randomly will be described.

In the procedure shown in FIG. 7, Steps S100 to S102 are the same as those of the above-described embodiment.

In Step S104 shown in FIG. 7, the driving parameter is selected by the driving parameter selecting section 40-4 based on the random number Rn and the driving voltage Vd. In this embodiment, as a driving parameter, in addition to the above-described holding time, the overlapping ratio of the waveform A will be described.

In FIGS. 6A and 6B, the eighth column represents a minimum value of the overlapping ratio, and the ninth column represents a maximum value of the overlapping ratio, and a range from the minimum value to the maximum value of the overlapping ratio corresponding to each driving voltage Vd corresponds to a plurality of selectable waveform patterns.

For example, in a case where the driving voltage Vd is 87 V during a period in which the discharge lamp 90 is driven in a driving mode for driving the discharge lamp with relatively high driving power, as shown in FIG. 6A, the selectable range of the overlapping ratio is 0% to 10%. Thus, an overlapping ratio is selected from values in the selectable range.

The overlapping ratio Of is calculated by using the following equation, wherein the overlapping ratio is denoted by Of, the lower limit of the selectable range is denoted by Omin, and the upper limit of the selectable range is denoted by Omax.

$$Of = Omin + (Omax - Omin) \times Rn$$

For example, in a case where Rn=0.5, Of=0+(10−0)×0.5=5%. The random number Rn takes any one value from the range of "0" to "1" and is a uniformly distributed random number. Accordingly, the overlapping ratio Of takes any one value from the lower limit to the upper limit of the selectable range and is distributed at a uniform probability.

After Step S104, the driving parameter is changed to the value selected in S104, and the AC driving current I is generated (Step S106). In this modified example, by changing control of the current value of the DC current Id during the half cycle of the AC driving current I in the current control section 40-1, the AC driving current I of which the overlapping ratio of the waveform A is changed can be generated.

Figure 10:
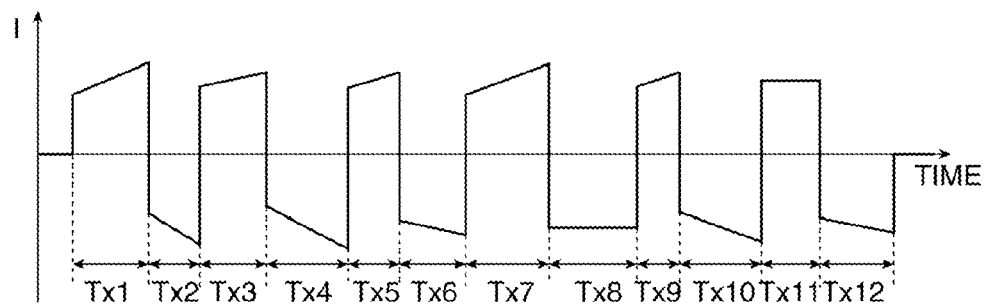
FIG. 10 is a timing chart illustrating an example of the waveform of an AC driving current that is generated in a modified example of a first embodiment.

FIG. 10 is a timing chart showing an example of the waveform of the AC driving current I that is generated in this modified example. In the figure, the horizontal axis represents a time, and the vertical axis represents an AC driving current I. In addition, Tx1 to Tx12 are holding times.

As the overlapping ratio increases, the temperature of the electrode serving as the anode rises. Thus, in addition to the randomly selecting of the holding time Tx, during which the AC driving current I continues to have a same polarity, from the first range at a predetermined probability, the discharge lamp 90 is driven by randomly selecting the waveform at a predetermined probability, whereby the temperature of the electrode changes randomly. Accordingly, formation of a steady convection current within the discharge lamp is suppressed further by combining the changing of the holding time and the changing of the overlapping ratio together. Therefore, uneven wear of the electrodes and uneven segregation of the electrode materials can be prevented.

In addition, since the energy supplied between the electrodes of the discharge lamp statistically (randomly) changes, the sizes of arc spots near the protrusions 552*p* and 562*p* of the electrodes statistically (randomly) change. Accordingly, by combining the changing of the holding time and the changing of the overlapping ratio together, the deformation of the protrusions 552*p* and 562*p* of the electrodes can be suppressed further by suppressing uneven melting states of the electrodes.

3. Discharge Lamp Lighting Device According to Second Embodiment

Next, an example in which the memory unit 44 stores at least the duty ratio of the AC driving current I as a driving parameter that defines the AC driving current I, and the control unit 40 selects a duty ratio value of the AC driving current I from values in a second range at a predetermined probability based on a predetermined time condition and controls the discharge lamp driving unit based on the selected duty ratio value of the AC driving current I will be described. A same reference sign is attached to each configuration that is common to that of the first embodiment, and a description thereof is omitted here.

The duty ratio is a ratio of the length of the first polarity section Tp to the length of one cycle of the AC driving current I. The duty ratio can be controlled by changing the polarity-inversion timings of the AC driving current I by using the AC conversion control section 40-2.

The predetermined time condition, for example, may be a time when each predetermined number of cycles of the AC driving current elapses or a time when each predetermined time elapses. In this embodiment, an example in which the duty ratio is selected for each one cycle for driving will be described.

The predetermined probability, for example, may be a probability having uniform distribution in the second range or a probability having specific distribution (for example, normal distribution). In this embodiment, an example in which the probability has the uniform distribution in the second range will be described.

The control unit 40 may be configured to set the second range based on the driving voltage Vd for the discharge lamp that is detected by the voltage detection section of the operation detecting unit 60.

Hereinafter, an example of a procedure for changing the duty ratio of the AC driving current I will be described with reference to FIG. 7.

In the procedure shown in FIG. 7, Steps S100 to S102 are the same as those of the above-described embodiment.

In Step S104 shown in FIG. 7, a driving parameter is selected based on the random number Rn and the driving voltage Vd by the driving parameter selecting section 40-4. In this embodiment, as one of the driving parameters, a duty ratio of the AC driving current I will be described.

In FIGS. 6A and 6B, the fourth column represents a minimum value of the duty ratio, and the fifth column represents a maximum value of the duty ratio. In addition, a range from the minimum value to the maximum value of the duty ratio corresponding to each driving voltage Vd corresponds to the second range.

For example, in a case where the driving voltage Vd is 87 V during a period in which the discharge lamp 90 is driven in a driving mode for driving the discharge lamp with relatively high driving power, as shown in FIG. 6A, the second range is 40% to 60%. Accordingly, the duty ratio is selected from values in the second range.

The duty ratio D is calculated by using the following equation, wherein the duty ratio D of the AC driving current I is denoted by D, the lower limit of the second range is denoted by Dmin, and the upper limit of the second range is denoted by Dmax.

$$D = Dmin + (Dmax - Dmin) \times Rn$$

For example, in a case where Rn=0.5, D=40+(60−40)×0.5=50%. The random number Rn is acquired by taking any one value from the range of "0" to "1" and is uniformly distributed. Thus, the duty ratio D is acquired by taking one value from the range of the lower limit to the upper limit of the second range and is distributed at a uniform probability.

After Step S104, the driving parameter is changed to the value selected in S104, and the AC driving current I is generated (Step S106). In this modified example, by changing the polarity-inversion timing of the AC driving current I for the AC conversion control section 40-2, the AC driving current I of which the duty ratio is changed can be generated.

Figure 11:
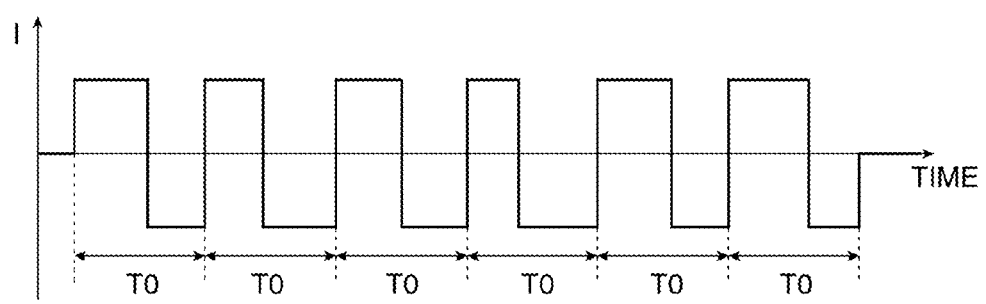
FIG. 11 is a timing chart illustrating an example of the waveform of an AC driving current that is generated in a second embodiment.

FIG. 11 is a timing chart showing an example of the waveform of the AC driving current I that is generated in this embodiment. In the figure, the horizontal axis represents a time, and the vertical axis represents an AC driving current I. In addition, T0 is a cycle of the AC driving current I.

As the duty ratio increases, the temperature of a first electrode having a time period, during which the first electrode serves as the anode increased, rises, and the temperature of a second electrode having a time period, during which the second electrode serves as the anode decreased, falls. In addition, as the duty ratio decreases, the temperature of the second electrode having a time period, during which the second electrode serves as the anode increased, rises, and the temperature of the first electrode having a time period, during which the first electrode serves as the anode decreased, falls.

Thus, by randomly selecting the duty ratio D of the AC driving current I from the second range at a predetermined probability, the temperature of the electrode changes randomly. Accordingly, formation of a steady convection current within the discharge lamp is suppressed, whereby uneven wear of the electrodes and uneven segregation of the electrode materials can be prevented.

In addition, since the energy supplied between the electrodes of the discharge lamp statistically (randomly) changes, the sizes of arc spots near the protrusions 552p and 562p of the electrodes statistically (randomly) change. Accordingly, the deformation of the protrusions 552p and 562p of the electrodes can be suppressed by suppressing uneven melting states of the electrodes.

In addition, the driving voltage Vd has high correlation with a distance between the electrodes, that is, the degradation states of the electrodes of the discharge lamp 90. Accordingly, by setting the second range based on the driving voltage Vd, the discharge lamp 90 can be driven based on the driving parameters corresponding to the degradation states of the electrodes.

Modified Example 1

In the above-described embodiment, a case where the duty ratio of the AC driving current I is changed randomly has been described. However, additionally, the frequency of the AC driving current I may be controlled to be randomly changed. In other words, it may be configured that the memory unit 44 stores the frequency of the AC driving current I as a driving parameter that defines the AC driving current I, and the control unit 40 selects a frequency value of the AC driving current I from values in a third range at a predetermined probability based on a predetermined time condition and controls the discharge lamp driving unit based on the selected frequency value of the AC driving current I.

The control unit 40 may be configured to set the third range based on the driving voltage Vd of the discharge lamp that is detected by the voltage detection section of the operation detecting unit 60.

Hereinafter, an example of a procedure for changing the frequency of the AC driving current I will be described with reference to FIG. 7.

In the procedure shown in FIG. 7, Steps S100 to S102 are the same as those of the above-described embodiment.

In Step S104 shown in FIG. 7, a driving parameter is selected based on the random number Rn and the driving voltage Vd by the driving parameter selecting section 40-4. In this embodiment, as one of the driving parameters, in addition to the duty ratio of the AC driving current I described above, the frequency of the AC driving current I will be described.

In FIGS. 6A and 6B, the sixth column represents a minimum value of the frequency, and the seventh column represents a maximum value of the frequency. In addition, a range from the minimum value to the maximum value of the frequency corresponding to each driving voltage Vd corresponds to the third range.

For example, in a case where the driving voltage Vd is 87 V during a period in which the discharge lamp 90 is driven in a driving mode for driving the discharge lamp with relatively high driving power, as shown in FIG. 6A, the third range is 20 Hz to 165 Hz. Accordingly, the frequency is selected from values in the third range.

The frequency F is calculated by using the following equation, wherein the frequency of the AC driving current I is denoted by F, the lower limit of the third range is denoted by Fmin, and the upper limit of the third range is denoted by Fmax.

$$F = F\min + (F\max - F\min) \times Rn$$

For example, in a case where Rn=0.5, F=20+(165−20)×0.5=92.5 Hz. The random number Rn is acquired by taking any one value from the range of "0" to "1" and is uniformly distributed. Thus, the frequency F is acquired by taking any one value from the range of the lower limit to the upper limit of the third range and is distributed at a uniform probability.

After Step S104, the driving parameter is changed to the value selected in S104, and the AC driving current I is generated (Step S106). In this modified example, by changing the control of the AC driving current I in the current control section 40-1, the AC driving current I whose frequency is changed can be generated.

Figure 12:
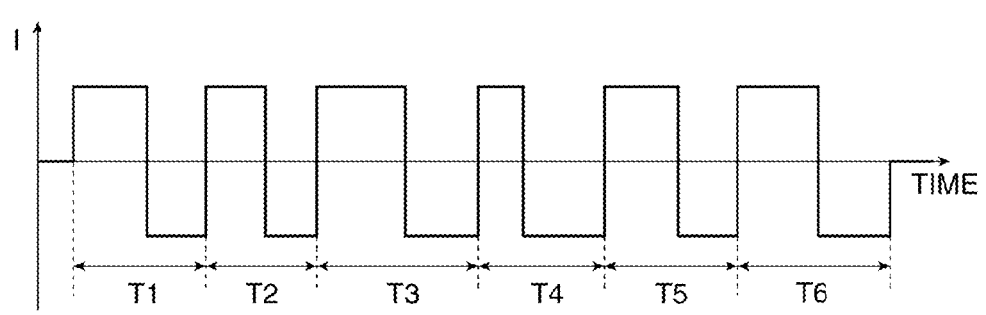
FIG. 12 is a timing chart illustrating an example of the waveform of the AC driving current that is generated in a first modified example of a second embodiment.

FIG. 12 is a timing chart showing an example of the waveform of the AC driving current I that is generated in this modified example. In the figure, the horizontal axis represents a time, and the vertical axis represents an AC driving current I. In addition, T1 to T6 are cycles (reciprocals of frequencies).

As the frequency decreases, the temperature of the electrode serving as the anode rises. Thus, in addition to the randomly selecting of the duty ratio D of the AC driving current I from the second range at a predetermined probability, the discharge lamp 90 is driven by randomly selecting the frequency from the third range at a predetermined probability, whereby the temperature of the electrode changes randomly. Accordingly, formation of a steady convection current within the discharge lamp is suppressed further by combining the changing of the duty ratio and the changing of the frequency together. Therefore, uneven wear of the electrodes and uneven segregation of the electrode materials can be prevented.

In addition, since the energy supplied between the electrodes of the discharge lamp statistically (randomly) changes, the sizes of arc spots near the protrusions 552p and 562p of the electrodes statistically (randomly) change. Accordingly, by combining the changing of the duty ratio and the changing of the frequency together, the deformation of the protrusions 552p and 562p of the electrodes can be suppressed further by suppressing uneven melting states of the electrodes.

Modified Example 2

In the above-described embodiment, a case where the waveform of the AC driving current I is a rectangular waveform has been described. However, in addition to the controlling of the duty ratio D of the AC driving current I to be randomly changed, the waveform of the AC driving current I may be controlled to be changed randomly. In other words, it may be configured that the memory unit 44 stores the waveform of the AC driving current I as a driving parameter that defines the AC driving current I, and the control unit 40 selects a waveform of the AC driving current I from a plurality of selectable waveform patterns at a predetermined probability based on a predetermined time condition and controls the discharge lamp driving unit based on the selected waveform of the AC driving current I.

The control unit 40 may be configured to set a plurality of selectable waveform patterns based on the driving voltage Vd of the discharge lamp that is detected by the voltage detection section of the operation detecting unit 60.

For example, the waveform of the AC driving current I may be set to the waveform A shown in FIG. 9A or the waveform B shown in FIG. 9B. In addition, it may be configured that the waveform of the AC driving current I is set to the waveform A or the waveform B, and the overlapping ratio is changed.

A concrete example of the procedure for changing the waveform of the AC driving current I is the same as that described in the first embodiment (modified example).

Figure 13:
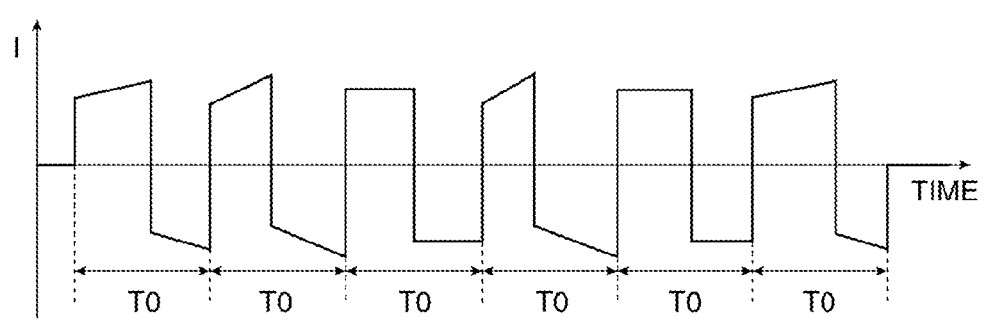
FIG. 13 is a timing chart illustrating an example of the waveform of the AC driving current that is generated in a second modified example of a second embodiment.

FIG. 13 is a timing chart showing an example of the waveform of the AC driving current I that is generated in this modified example. In FIG. 13, a case where the waveform of the AC driving current I is the waveform A, and the overlapping ratio is changed is shown. In the figure, the horizontal axis represents a time, and the vertical axis represents an AC driving current I. In addition, T0 is the cycle of the AC driving current I.

As the overlapping ratio increases, the temperature of the electrode serving as the anode rises. Thus, in addition to the randomly selecting of the duty ratio D of the AC driving current I from the second range at a predetermined probability, the discharge lamp 90 is driven by randomly selecting the waveform at a predetermined probability, whereby the temperature of the electrode changes randomly. Accordingly, formation of a steady convection current within the discharge lamp is suppressed further by combining the changing of the duty ratio and the changing of the overlapping ratio together. Therefore, uneven wear of the electrodes and uneven segregation of the electrode materials can be prevented.

In addition, since the energy supplied between the electrodes of the discharge lamp statistically (randomly) changes, the sizes of arc spots near the protrusions 552p and 562p of the electrodes statistically (randomly) change. Accordingly, by combining the changing of the duty ratio and the changing of the overlapping ratio together, the deformation of the protrusions 552p and 562p of the electrodes can be suppressed further by suppressing uneven melting states of the electrodes.

In addition, the discharge lamp 90 is driven by randomly selecting the frequency from the third range at a predetermined probability, and accordingly, the temperature of the electrode randomly changes. Therefore, formation of a steady convection current within the discharge lamp is suppressed further, whereby uneven wear of the electrodes and uneven segregation of the electrode materials can be prevented. In addition, by additionally combining the changing of the frequency, the deformation of the protrusions 552p and 562p of the electrodes can be suppressed further by suppressing uneven melting states of the electrodes.

Modified Example 3

In the above-described embodiment, as the predetermined time condition, an example in which driving is performed by selecting the duty ratio for each cycle has been described.

However, the control unit 40 may be configured to set the predetermined time condition based on the driving voltage Vd of the discharge lamp that is detected by the voltage detection section of the operation detecting unit 60.

Hereinafter, an example of a procedure for changing the predetermined time condition will be described with reference to FIG. 7.

In the procedure shown in FIG. 7, Steps S100 to S102 are the same as those of the above-described embodiment.

In Step S104 shown in FIG. 7, a driving parameter is selected based on the random number Rn and the driving voltage Vd by the driving parameter selecting section 40-4. In this embodiment, an example in which, as one of the driving parameters, a time (corresponding to a predetermined time condition) until a change of the driving parameter is changed will be described.

In FIGS. 6A and 6B, the tenth column represents a minimum value of the time (number of cycles) until the change of the driving parameter, and the eleventh column represents a maximum value of the time (number of cycles) until the change of the driving parameter. This time is a time for driving the discharge lamp 90 based on the same driving parameter.

For example, in a case where the driving voltage Vd is 87 V during a period in which the discharge lamp 90 is driven in a driving mode for driving the discharge lamp with relatively high driving power, as shown in FIG. 6A, the selectable time (number of cycles) is in the range of 5 cycles to 100 cycles. Accordingly, the time (number of cycles) is selected from values in this range. Hereinafter, an example in which the time (number of cycles) until the change of the driving parameter is the integral multiple of the number of cycles will be described.

The time P until the change of the driving parameter is calculated by using the following equation, wherein the time until the change of the driving parameter is denoted by P, the lower limit of selectable time (number of cycles) is denoted by Pmin, and the upper limit of the selectable time (number of cycles) is denoted by Pmax.

$$P = P\min + [(P\max - P\min) \times Rn]$$

Here, symbol [ ] is a Gauss symbol.

For example, in a case where Rn=0.5, P=5+[(100−5)×0.5] =52 cycles. The random number Rn is acquired by taking any one value from the range of "0" to "1" and is uniformly distributed. Thus, the time P until the change of the driving parameter is acquired by taking any one value from the range of the lower limit to the upper limit of the selectable time (number of cycles) and is distributed at a uniform probability.

After Step S104, the driving parameter is changed to the value selected in S104, and the AC driving current I is generated (Step S106). In this modified example, by changing the time until the change of the driving parameter in the current control section 40-1 and the AC conversion control section 40-2, the AC driving current I of which the time P until the change of the driving parameter is changed can be generated.

As the time P until the change of the driving parameter decreases, the thermal state inside the discharge lamp rapidly changes. By additionally combining the changing of the time P until the change of the driving parameter, the deformation of the protrusions 552p and 562p of the electrodes can be suppressed further by suppressing uneven melting states of the electrodes.

4. Discharge Lamp Lighting Device According to Third Embodiment

In addition to the control processes described in the first and second embodiments, a control process corresponding to the driving power of the discharge lamp 90 may be added additionally. In other words, the control unit 40 has a plurality of driving modes for driving the discharge lamp 90 with different driving power values and set at least one of the predetermined time condition, the first range, the second range, the third range, and the plurality of selectable waveform patterns based on the driving mode.

FIG. 14 is a flowchart showing an example of a procedure for generating an AC driving current I by changing the driving parameters based on a driving mode. The procedure shown in FIG. 14 may be performed each time the predetermined time condition is satisfied. Alternatively, the AC driving current may be generated by summing up the waveforms of the AC driving currents I corresponding to a predetermined time (for example, several minutes) by performing the procedure shown in FIG. 14 once.

First, the driving mode of the discharge lamp 90 is set (Step S200). In this embodiment, an example in which there are two driving modes including a high-luminance mode for driving the discharge lamp 90 with relatively high power and a low-power mode for driving the discharge lamp 90 with relatively low power will be described. The setting of the driving mode may be performed, for example, by receiving a mode setting signal S generated based on a user's operation or the like by using the control unit 40.

Next, a random number Rn is generated by the random number generating section 40-3 and is selected (Step S202). The detailed process of Step S202 is the same as that of Step S104, which is shown in FIG. 7, in the first and second embodiments.

Next, a driving voltage Vd is detected by the voltage detecting unit (Step S204). The driving voltage Vd to be detected may be acquired as an average value for a predetermined time (for example, several minutes).

Next, a driving parameter is selected based on the driving mode, the random number Rn, and the driving voltage Vd by the driving parameter selecting section 40-4 (Step S206). The driving parameter selection section 40-4 selects a correspondence table between the driving voltage Vd and the driving parameter based on the driving mode. In this embodiment, a table shown in FIG. 6A is selected in the high-luminance mode, and a table shown in FIG. 6B is selected in the low-power mode. After the correspondence table between the driving voltage Vd and the driving parameter is selected, a process for selecting each driving parameter is the same as that of Step S104, which is shown in FIG. 7, in the first and second embodiments.

After Step S206, the driving parameter is changed to the value selected in S206, and the AC driving current I is generated (Step S208). A detailed process of Step S208 is the same as that of Step S106, which is shown in FIG. 7, in the first and second embodiments.

The temperature of the electrode is in proportion to the power supplied to the discharge lamp 90. Thus, when the discharge lamp 90 is driven with low power, particular consideration is necessary in order to suppress generation of flicker at the time when the temperature of the electrode decreases.

Thus, by setting the driving parameter according to the driving mode, the generation of flicker at low-power driving can be suppressed.

The procedure shown in FIG. 14 is an example, and various modifications can be made therein. FIG. 15 is a flowchart showing another example of the procedure for generating the AC driving current I by changing the driving parameter based on the driving mode. Similarly to the example described above with reference to FIG. 14, an example in which there are two driving modes including a high-luminance mode for driving the discharge lamp 90 with relatively high power and a low-power mode for driving the discharge lamp 90 with relatively low power will be described.

Next, a random number Rn is generated by the random number generating section 40-3 and is selected (Step S202). The detailed process of Step S202 is the same as that of Step S104, which is shown in FIG. 7, in the first and second embodiments.

Next, a driving voltage Vd is detected by the voltage detecting unit (Step S204). The driving voltage Vd to be detected may be acquired as an average value for a predetermined time (for example, several minutes).

Next, a driving parameter is selected based on the random number Rn and the driving voltage Vd by the driving parameter selecting section 40-4 (Step S300). The driving parameter selection section 40-4 selects each driving parameter from a correspondence table between the driving voltage Vd and the driving parameter corresponding to each driving mode. In this embodiment, each driving parameter is selected from a table shown in FIG. 6A for the high-luminance mode and is selected from a table shown in FIG. 6B for the low-power mode. The process for selecting each driving parameter from each correspondence table is the same as that of Step S104, which is shown in FIG. 7, in the first and second embodiments.

Next, the driving mode of the discharge lamp 90 is set (Step S200). The setting of the driving mode may be performed, for example, by receiving a mode setting signal S generated based on a user's operation or the like by using the control unit 40.

Next, the AC driving current I is generated by changing the driving parameter to the value selected in S300 based on the driving mode set in Step S200 (Step S302). When the high-luminance mode is set, the driving parameter is changed to a value of the driving parameter selected from the table shown in FIG. 6A. On the other hand, when the low-power mode is set, the driving parameter is set to a value of the driving parameter selected from the table shown in FIG. 6B. A detailed operation for generating the AC driving current I based on the driving parameter selected in Step S300 is the same as that of Step S106, which is shown in FIG. 7, in the first and second embodiments.

In addition, in the description referring to the above-described flowcharts shown in FIGS. 14 and 15, only the procedure for changing the driving parameter is described. For example, the changing of the driving power in accordance with the changing of the driving mode may be performed at a time when the mode setting signal S is received in Step S200 or at a time when the AC driving current I is generated by changing the driving parameter in Step S208.

5. Circuit Configuration of Projector

Figure 16:
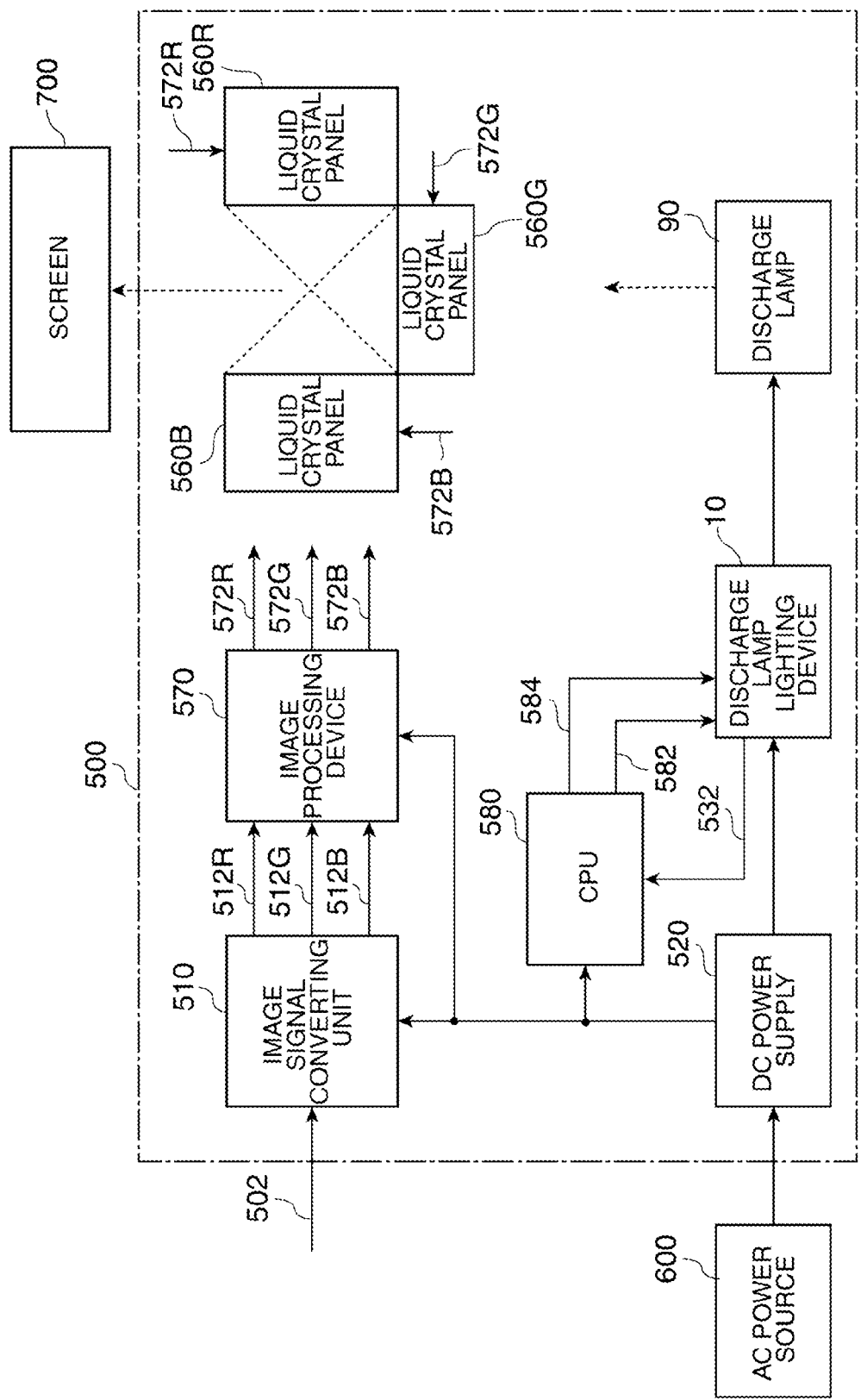
FIG. 16 is a diagram illustrating an example of the circuit configuration of a projector according to an embodiment.

FIG. 16 is a diagram showing an example of the circuit configuration of a projector according to an embodiment of the disclosure. A projector 500 includes an image signal converting unit 510, a DC power supply 520, the discharge lamp lighting device 10, the discharge lamp 90, liquid crystal panels 560␣, 560G and 560B, and an image processing device 570, in addition to the previously described optical system.

The image signal converting unit 510 converts an image signal 502 input from the outside (a luminance-color difference signal, an analog RGB signal, or the like) into a digital RGB signal having a predetermined word length for generating image signals 512R, 512G and 512B and supplies these image signals to the image processing device 570.

The image processing device 570 carries out image processing for each of the three image signals 512R, 512G and 512B and outputs driving signals 572R, 572G and 572B used for driving the liquid crystal panels 560R, 560G and 560B.

The DC power supply 520 converts an AC voltage supplied from an external AC power source 600 into a constant DC voltage and supplies the DC voltage to the image signal converting unit 510 and the image processing device 570, which are disposed on the secondary side of a transformer (not shown, but included in the DC power supply 520) and the discharge lamp lighting device 10, which is disposed on the primary side of the transformer.

The discharge lamp lighting device 10 generates a high voltage between the electrodes of the discharge lamp 90 at the time of startup, thus causes dielectric breakdown, and forms a discharge path. Thereafter, the discharge lamp lighting device 10 supplies a driving current to maintain discharge of the discharge lamp 90.

The liquid crystal panels 560R, 560G and 560B modulate the luminance of color light beams that are incident on the liquid crystal panels in accordance with the driving signals 572R, 572G and 572B.

A CPU 580 controls operations of the projector from start of lighting of the projector to the lighting-out of the projector. When the power of the projector is turned on and the output voltage of the DC power supply 520 reaches a predetermined value, the CPU 580 generates and supplies a lighting signal 582 to the discharge lamp lighting device 10. In addition, the CPU 580 may be configured to supply the mode setting signal 584 to the discharge lamp lighting device 10. The CPU 580 may be configured to receive lighting information 532 of the discharge lamp 90 from the discharge lamp lighting device 10.

In the projector 500 having such a configuration, formation of a steady convection current inside the discharge lamp can be suppressed, and accordingly uneven wear of the electrodes and uneven segregation of the electrode materials can be prevented. Moreover, the deformation of the front-end protrusions of the electrodes can be suppressed further by suppressing uneven melting states of the electrodes. Therefore, a projector that can maintain projection luminance for a long time can be realized.

In the above embodiments, the projector having three liquid crystal panels is used as an example. However, the disclosure is not limited thereto and can be applied to a projector having one, two, or four or more liquid crystal panels.

In the above embodiments, the transmission-type projector is used as an example. However, the disclosure is not limited thereto and can be applied to a reflection-type projector. Here, the "transmission-type" refers to a type such as a transmission-type liquid crystal panel in which an electro-optical modulation device as a light modulating unit transmits light. The "reflection-type" refers to a type such as a reflection-type liquid crystal panel or a micromirror-type light modulation device in which an electro-optical modulation device as a light modulating unit reflects light. As a micromirror-type light modulation device, for example, DMD (Digital Micromirror Device; trademark of Texas Instruments) can be used. Also in the case where the disclosure is applied to a reflection-type projector, the same advantages as those of the transmission-type projector can be acquired.

The disclosure can also be applied to a front projection-type projector that projects a projection image from the observing side and a rear projection-type projector that projects a projection image from the opposite side of the observing side.

The disclosure is not limited to the above embodiments, and various modifications can be made therein without departing from the scope of the basic concept of the disclosure.

The disclosure includes substantially the same configuration as the configuration described in the embodiments (for example, a configuration that implements the same function, method and result, or a configuration that implements the same object and advantages). The disclosure also includes a configuration in which unessential parts of the configuration described in the embodiments are replaced. The disclosure also includes a configuration that achieves the same advantages as those of the configuration described in the embodiments or a configuration that can achieve the same object as that of the configuration described in the embodiments. The disclosure also includes a configuration described in the embodiments with known technology added thereto. Therefore, it is manifestly intended that embodiments in accordance with the present disclosure be limited only by the claims and the equivalents thereof.

What is claimed is:

1. A discharge lamp lighting device comprising:
   a discharge lamp driving unit that drives a discharge lamp by supplying an AC driving current to the discharge lamp;
   a memory unit configured to store driving parameters for the AC driving current; and
   a control unit configured to control the discharge lamp driving unit based on the driving parameters stored in the memory unit,
   wherein the driving parameters comprise a range of holding time values, each holding time value representing a time period in which the AC driving current is to be continuously maintained at a same polarity, and
   wherein at a predetermined time condition, the control unit selects one of the holding time values based on a predetermined probability and controls the discharge lamp driving unit based on the selected holding time value.

2. The discharge lamp lighting device according to claim 1, wherein the driving parameters further include a plurality of selectable waveform patterns, and
   wherein at a predetermined time condition, the control unit selects a waveform from the plurality of selectable waveform patterns based on a predetermined probability and controls the discharge lamp driving unit based on the selected waveform.

3. The discharge lamp lighting device according to claim 2, further comprising a voltage detecting unit to detect a driving voltage of the discharge lamp,
   wherein the control unit sets at least one of the predetermined time condition, the range of holding time values, and the plurality of selectable waveform patterns based on the driving voltage detected by the voltage detecting unit.

4. The discharge lamp lighting device according to claim 2, wherein the control unit has a plurality of driving modes for driving the discharge lamp with different driving power values, and
   wherein the control unit sets at least one of the predetermined time condition, the range of holding time values, and the plurality of selectable waveform patterns based on the driving mode.

5. The discharge lamp lighting device according to claim 1, wherein the discharge lamp driving unit comprises:
   a power control circuit that generates a driving power supplied to the discharge lamp; and an AC converter circuit that generates and outputs the AC driving current supplied to the discharge lamp by inverting a polarity of a DC current output from the power control circuit at a predetermined timing, wherein the control unit controls the discharge lamp driving unit by performing at least one of (i) an AC conversion control operation that controls a polarity inverting timing of the AC driving current with the AC converter circuit, and (ii) a current control operation that controls a current value of the DC current with the power control circuit.

6. A projector comprising the discharge lamp lighting device according to claim 1.

7. A discharge lamp lighting device comprising:
a discharge lamp driving unit that drives a discharge lamp by supplying an AC driving current to the discharge lamp;
a memory unit configured to store driving parameters for the AC driving current; and
a control unit configured to control the discharge lamp driving unit based on the driving parameters stored in the memory unit,
wherein the driving parameters comprise a range of duty ratio values, each duty ratio value corresponding to a duty ratio of the AC driving current, the duty ratio being a ratio of a length of a first polarity section of the AC driving current and a length of one cycle of the AC driving current, and
wherein at a predetermined time condition, the control unit selects one of the duty ratio values corresponding to the duty ratio based on a predetermined probability and controls the discharge lamp driving unit based on the selected duty ratio.

8. The discharge lamp lighting device according to claim 7,
wherein the driving parameters further include a range of frequencies of the AC driving current, and
wherein at a predetermined time condition, the control unit selects a frequency value from the range of frequencies based on a predetermined probability and controls the discharge lamp driving unit based on the selected frequency value.

9. The discharge lamp lighting device according to claim 8, further comprising a voltage detecting unit to detect a driving voltage of the discharge lamp,
wherein the control unit sets the predetermined time condition, the range of duty ratio values and the range of frequencies based on the driving voltage detected by the voltage detecting unit.

10. The discharge lamp lighting device according to claim 8, wherein the control unit has a plurality of driving modes for driving the discharge lamp with different driving power values,
wherein the control unit sets at least one of the predetermined time condition, the range of duty ratio values and the range of frequencies based on the driving mode.

11. The discharge lamp lighting device according to claim 7,
wherein the discharge lamp driving unit comprises:
a power control circuit that generates a driving power supplied to the discharge lamp; and
an AC converter circuit that generates and outputs the AC driving current supplied to the discharge lamp by inverting a polarity of a DC current output from the power control circuit at a predetermined timing,
wherein the control unit controls the discharge lamp driving unit by performing at least one of (i) an AC conversion control operation that controls a polarity inverting timing of the AC driving current with the AC converter circuit, and (ii) a current control operation that controls a current value of the DC current with the power control circuit.

12. A projector comprising the discharge lamp lighting device according to claim 7.

13. A method of driving a discharge lamp with an AC driving current comprising:
at a predetermined time condition, selecting a holding time value from a range of holding time values based on a predetermined probability, each holding time value representing a time period in which the AC driving current is to be continuously maintained at a same polarity; and
driving the discharge lamp based on the selected holding time value.

14. The method according to claim 13, further comprising:
at a predetermined time condition, selecting a waveform for the AC driving current from a plurality of selectable waveform patterns based on a predetermined probability; and
driving the discharge lamp based on the selected waveform.

15. The method according to claim 14, further comprising:
detecting a driving voltage of the discharge lamp; and
setting at least one of the range of the holding time values and the plurality of selectable waveform patterns based on the driving voltage of the discharge lamp.

16. The method according to claim 14, further comprising:
selecting a driving mode from a plurality of driving modes for driving the discharge lamp at different driving power values; and
setting at least one of the range of the holding time values and the plurality of selectable waveform patterns based on the selected driving mode.

17. A method of driving a discharge lamp with an AC driving current comprising:
at a predetermined time condition, selecting a duty ratio value of the AC driving current from a range of duty ratio values based on a predetermined probability, the duty ratio being a ratio of a length of a first polarity section of the AC driving current and a length of one cycle of the AC driving current; and
driving the discharge lamp based on the selected duty ratio value of the AC driving current.

18. The method according to claim 17, further comprising:
at a predetermined time condition, selecting a frequency value of the AC driving current from a range of frequencies based on a predetermined probability; and
driving the discharge lamp based on the selected frequency value.

19. The method according to claim 18, further comprising:
detecting a driving voltage of the discharge lamp; and
setting at least one of the range of the duty ratio values and the range of the frequencies based on the driving voltage of the discharge lamp.

20. The method according to claim 18, further comprising:
selecting a driving mode from a plurality of driving modes for driving the discharge lamp at different driving power values; and
setting at least one of the range of the duty ratio values and the range of the frequencies based on the selected driving mode.

* * * * *